US012810520B2

(12) United States Patent
Ciabarra et al.

(10) Patent No.: US 12,810,520 B2
(45) Date of Patent: Nov. 24, 2026

(54) SYSTEM AND METHOD FOR INTERACTIVE HOLOGRAPHIC TELEPRESENCE WITH GENERATIVE AI ENHANCEMENT

(71) Applicant: Athena Security, Inc., Austin, TX (US)

(72) Inventors: Christopher Carlo Ciabarra, Jacksonville, FL (US); Lisa Marie Falzone, Tiburon, CA (US); Michael Leonard Green, Tiburon, CA (US)

(73) Assignee: ATHENA SECURITY, INC., Austin, TX (US)

( * ) Notice: Subject to any disclaimer, the term of this patent is extended or adjusted under 35 U.S.C. 154(b) by 0 days.

(21) Appl. No.: 19/417,602

(22) Filed: Dec. 12, 2025

(65) Prior Publication Data

US 2026/0179295 A1 Jun. 25, 2026

Related U.S. Application Data

(60) Provisional application No. 63/736,697, filed on Dec. 20, 2024.

(51) Int. Cl.

| | |
|---|---|
| ***G06T 13/40*** | (2011.01) |
| ***G03H 1/00*** | (2006.01) |
| ***G06F 3/01*** | (2006.01) |
| ***G06F 3/16*** | (2006.01) |
| ***G06T 13/20*** | (2011.01) |
| ***G08B 21/18*** | (2006.01) |
| ***G10L 13/02*** | (2013.01) |

(52) U.S. Cl.

CPC ........... *G06T 13/40* (2013.01); *G03H 1/0005* (2013.01); *G06F 3/167* (2013.01); *G06T 13/205* (2013.01); *G03H 2001/0088* (2013.01); *G06F 3/011* (2013.01); *G06T 2200/24* (2013.01); *G08B 21/18* (2013.01); *G10L 13/02* (2013.01)

(58) Field of Classification Search

None

See application file for complete search history.

(56) References Cited

U.S. PATENT DOCUMENTS

| | | | | |
|---|---|---|---|---|
| 2021/0409516 | A1* | 12/2021 | Saraf | H04L 67/131 |
| 2024/0037685 | A1 | 2/2024 | Ciabarra | |
| 2024/0412164 | A1* | 12/2024 | Maggiore | G06F 3/012 |
| 2025/0008290 | A1* | 1/2025 | Welch | G10K 15/02 |

* cited by examiner

*Primary Examiner* — Nurun Flora

(74) *Attorney, Agent, or Firm* — Amin, Turocy & Watson, LLP

(57) ABSTRACT

The present disclosure describes systems and methods for interactive holographic telepresence, enabling a remote operator to manage and engage with multiple holographic projections in real-time. The system features a plurality of hologram projection units, an operator station with a display and control interface, a generative artificial intelligence (AI) engine, and a communication network. The generative AI engine processes real-time data from the operator and environmental sensors, generating enhanced holographic representations, visual effects, audio effects, and interactive responses. The method involves capturing and enhancing an operator's video feed with AI-generated effects based on speech and environmental cues, then projecting the enhanced feed.

22 Claims, 10 Drawing Sheets

400

SYSTEM AND METHOD FOR INTERACTIVE HOLOGRAPHIC TELEPRESENCE WITH GENERATIVE AI ENHANCEMENT

CROSS-REFERENCE TO RELATED APPLICATIONS

This application claims priority to and the benefit of U.S. Provisional Application No. 63/736,697, titled "SYSTEM AND METHOD FOR INTERACTIVE HOLOGRAPHIC TELEPRESENCE WITH GENERATIVE AI ENHANCEMENT," filed Dec. 20, 2024, the entire disclosure of which is hereby incorporated herein by reference.

FIELD OF THE INVENTION

The present disclosure generally relates to interactive communication systems and more particularly, to interactive holographic telepresence systems utilizing generative artificial intelligence.

BACKGROUND

The realm of security and customer service operations has seen considerable evolution over recent decades, driven by advancements in digital communication and remote interaction technologies. Organizations across various sectors strive to maintain a robust and responsive presence for both protective measures and client engagement, often across geographically dispersed sites. The underlying technology in this domain encompasses a wide array of systems designed to facilitate remote oversight, communication, and interaction, aiming to bridge physical distances. These systems frequently incorporate elements such as video conferencing tools, remote monitoring platforms, and various digital communication channels to enable personnel to perform their duties without being physically stationed at each individual location. The ongoing development within this field seeks to enhance the efficacy and reach of such services, striving for solutions that offer greater flexibility, scalability, and integration with emerging technological paradigms. The deployment of advanced sensor networks, high-definition cameras, and sophisticated communication protocols forms the bedrock of these contemporary security and customer service frameworks. Furthermore, the integration of data analytics and automation has begun to augment the capabilities of these systems, allowing for proactive responses and data-driven decision-making processes. The continuous push for more efficient and comprehensive remote operational models underscores the ongoing efforts to refine and expand the technology supporting these functions across various operational environments.

The evolution of remote interaction technologies extends beyond mere surveillance, delving into the provision of interactive experiences that mimic in-person encounters. This involves the development of telepresence systems that allow individuals to appear and interact remotely, fostering a sense of co-presence. Such systems often utilize high-resolution displays, advanced audio equipment, and sometimes robotic components to enable a remote operator to perceive and engage with a distant environment. The objective is to create a seamless and natural communication flow, reducing the psychological distance between participants. These technological endeavors are particularly pertinent in scenarios where expert assistance or personalized customer interaction is required at multiple points simultaneously, without the logistical constraints of physical travel between such points. These telepresence solutions demand high-bandwidth network connectivity and low-latency data transmission to deliver a convincing and responsive remote presence.

Existing frameworks for remote security and customer service, despite their advancements, encounter several limitations that hinder their widespread adoption and effectiveness. A significant challenge lies in the inherent inefficiency and considerable cost associated with requiring personnel to maintain a physical presence at multiple, often disparate, locations. This operational model incurs substantial expenses related to staffing, travel, infrastructure, and logistical coordination, which can become prohibitive for organizations operating on a large scale or across vast geographical areas. The deployment of human resources to cover numerous sites simultaneously often leads to underutilization of personnel during periods of low activity or, conversely, overstretching resources during peak demands, thereby compromising service quality or security vigilance. Moreover, the physical presence model inherently restricts the scalability and flexibility of operations, making it challenging to rapidly adapt to changing security threats or fluctuating customer service demands. The reliance on human guards or service agents at each location also introduces variability in performance and consistency, depending on individual training, experience, and attentiveness. These factors collectively contribute to an operational paradigm that, while traditional, struggles to meet the modern demands for efficiency, cost-effectiveness, and uniform service delivery across an expanding operational footprint.

The current landscape of telepresence solutions, while offering a degree of remote interaction, frequently falls short in delivering the immersive and interactive capabilities that are truly necessary for effective communication and engagement. Many existing systems provide a limited sensory experience, often relying solely on two-dimensional video feeds and/or basic audio, which fails to replicate the nuances of face-to-face interaction. This lack of immersion can lead to reduced engagement, misinterpretation of non-verbal cues, and an overall diminished sense of presence for both the remote operator and the local participants. The absence of depth perception, spatial awareness, and the ability to naturally manipulate or interact with the remote environment significantly constrains the utility of these solutions for complex tasks or nuanced customer interactions. Furthermore, the interactivity often remains rudimentary, with limited options for dynamic response or personalized engagement beyond pre-programmed scripts or simple command inputs. Such limitations prevent telepresence systems from fully replacing the richness and spontaneity of direct human contact, thereby restricting their applicability in situations demanding high levels of empathy, detailed problem-solving, or adaptive security responses. The technological gaps continue to pose a hurdle for the broader acceptance and utility of these remote communication platforms.

Various approaches have been explored to address aspects of remote monitoring and interaction. Some companies present a live video feed, which offers real-time visual information from a remote location. This method provides a basic level of surveillance and observation, allowing personnel to view events as they unfold. However, a live video feed typically lacks the three-dimensional representation and interactive depth that would enable a more immersive experience. Such systems are primarily observational and may not facilitate dynamic engagement with the environment or the individuals within it. The information conveyed may be largely passive, requiring human interpretation and response based solely on visual and auditory input, without the benefit of spatial context or the ability to project an interactive persona. The limitations of a simple live video feed become apparent when more complex interactions, such as detailed customer service inquiries or nuanced security assessments, are required, as a flat visual representation may not adequately convey the necessary contextual information or allow for natural, responsive communication.

While some companies utilize generative AI for videos, this application typically involves the creation or manipulation of video content in a two-dimensional format. The use of generative AI in this context often focuses on tasks such as producing synthetic media, enhancing video quality, or automating content creation processes. However, the integration of generative AI capabilities directly into a holographic medium, where the AI would manifest as an interactive three-dimensional entity, has not been observed by the inventors.

Therefore, there is a need to overcome the problems discussed above, particularly concerning the inefficiencies and costs associated with physical presence, and the lack of immersive and interactive capabilities in existing telepresence solutions. A further need exists for a system that integrates advanced artificial intelligence directly into a three-dimensional holographic manifestation, moving beyond simple live video feeds or two-dimensional generative AI applications. Such a solution would aim to provide a more engaging, efficient, and scalable approach to remote security and customer service.

SUMMARY

One primary objective of the present disclosure is to provide interactive holographic telepresence, enabling a remote operator to control and interact with multiple holographic projections in real-time. Another objective of the present disclosure is to provide generative artificial intelligence enhancement to holographic representations, analyzing environmental cues and providing responsive interactions with individuals in physical locations associated with the holographic projections. Yet another objective of the present disclosure is to provide a system capable of generating visual and audio effects, offering information provision, and triggering alarms based on real-time environmental analysis. Still another objective of the present disclosure is to facilitate real-time data transmission and control for remote holographic interaction across diverse physical locations. A further objective of the present disclosure is to offer personalized holographic experiences through dynamic adjustments of appearance and interactive content.

According to one aspect of the present disclosure, a system for interactive holographic telepresence is provided, comprising a plurality of hologram projection units, each unit configured to project a holographic representation of a remote operator at a distinct physical location. The system also preferably comprises an operator station, comprising a display screen configured to show real-time feeds from cameras positioned at each physical location of the plurality of hologram projection units, a control interface configured to enable the remote operator to select a specific physical location, and a capture system configured to capture an image of the remote operator. A generative artificial intelligence engine is included, configured to process real-time data received from the operator station and from environmental sensors located at each physical location of the plurality of hologram projection units, the generative artificial intelligence engine further configured to generate enhanced holographic representations, visual effects, audio effects, and interactive responses based on the processed real-time data. A communication network is configured to establish real-time data transmission and control connectivity between the operator station and the plurality of hologram projection units.

The system further preferably involves the generative artificial intelligence engine being configured to analyze speech input from the remote operator and to generate visual aids, such as displaying keywords or phrases spoken by the operator in colors and animations, to enhance the holographic representation. The generative artificial intelligence engine is preferably further configured to analyze speech input from the remote operator and to generate audio effects, such as sounds or alterations to the operator's voice, to emphasize certain words or phrases. The generative artificial intelligence engine is preferably further configured to analyze environmental cues from the physical locations and to generate automated responses, which may include providing directions, triggering alarms, or activating or deactivating equipment. The automated responses may include activating or deactivating equipment such as conveyor belts, doors, locks, additional monitoring devices, scanning devices, lights, or computing devices. Furthermore, the generative artificial intelligence engine is preferably configured to dynamically change the appearance of the holographic representation to personalize or normalize the experience, which may involve adjusting skin tone, dress, clothing, accessories, voice, hair color, hair style, makeup, stature, posture, facial expressions, intonation, volume, or background. The capture system at the operator station may comprise a green screen or a similar system for capturing the operator's image. The communication network may be a wired network, a wireless network, or a combination thereof, and may utilize the Internet for data transmission. The holographic representation may be presented using a clear display screen with depth perception, optionally extending a distance behind the display screen to create an illusion of depth, and the clear display screen may be a transparent screen such as a 3d transparent showcase holographic display touch screen.

According to another aspect of the present disclosure, a method for interactive holographic telepresence is provided, the method comprising capturing a video feed of an operator at an operator station. The method preferably includes transmitting the video feed to a generative artificial intelligence engine, and analyzing speech from the operator and environmental cues at a physical location using the generative artificial intelligence engine. The method further preferably involves generating dynamic visual effects, audio effects, or both, based on the analyzed speech and environmental cues, and enhancing the video feed with the generated dynamic visual effects, audio effects, or both. The enhanced video feed is transmitted to a selected hologram projection unit at the physical location, and the enhanced video feed is projected using the selected hologram projection unit to create a holographic representation for interaction with individuals in the physical space.

The method of this aspect further preferably comprises monitoring one or more physical locations via a display screen at the operator station. Additionally, selecting a specific physical location using a control interface to activate a corresponding hologram projection unit is preferably included. Analyzing speech from the operator may involve using a speech-to-text artificial intelligence model to convert spoken words into text. The method further comprises using a text-to-speech artificial intelligence model to convert information typed or selected by the operator into speech to be relayed by the holographic representation. Generating a holographic video of the operator's mouth movement based on audio input is also preferably included, such that the holographic representation appears to be talking even when a live video feed of the operator is not available. Generating the holographic video of the operator's mouth movement may involve taking a video feed of a person, extracting relevant facial data, applying a language model to capture movements of the mouth from the extracted data, and then integrating the data into a holographic representation to provide a full-body holographic representation of the person talking. The method preferably further comprises triggering automated responses based on the environmental cues, which may include providing directions, triggering alarms, or activating equipment. The operator is preferably a human, but may be a generative artificial intelligence algorithm, a machine learning algorithm, or a combination thereof.

According to another aspect of the present disclosure, a computer program product comprising a non-transitory computer-readable medium storing instructions is provided, that when executed by one or more processors, cause the one or more processors to perform operations for interactive holographic telepresence. The operations comprise receiving a video feed of an operator from an operator station and receiving audio input from the operator. The operations also preferably include receiving environmental sensor data from a physical location associated with a hologram projection unit, and processing the video feed, audio input, and environmental sensor data using a generative artificial intelligence engine. Generating enhanced holographic representation data, visual effect data, and audio effect data based on the processed data is also preferably performed. The operations further include transmitting the enhanced holographic representation data, visual effect data, and audio effect data to the hologram projection unit, and causing the hologram projection unit to project a holographic representation preferably incorporating the enhanced holographic representation data, visual effect data, and audio effect data.

The computer program product of this aspect further preferably includes operations to analyze the operator's speech to identify keywords or phrases and generating corresponding visual aids for display by the holographic representation. Detecting sounds of distress or unauthorized access from the environmental sensor data and generating an alarm signal is preferably also a part of the operations. The operations further preferably comprise generating dynamic art displays for entertainment or engagement based on operator input or environmental cues. Additionally, adjusting the appearance of the holographic representation in real-time based on context-appropriate enhancements is preferably included. Processing the operator's audio input to generate mouth movements for the holographic representation, even when a live video feed of the operator is not available, may also be included.

According to another aspect of the present disclosure, a system for interactive holographic telepresence is provided, the system comprising a plurality of hologram projection units configured to project holographic representations of a remote operator at different physical locations. The system includes an operator station comprising a display screen and a control interface. A generative artificial intelligence engine configured to process real-time data preferably from at least one of the operator station and the hologram projection units is also part of the system. A communication network connecting and or streaming data to and from the operator station and the hologram projection units is also employed.

The system preferably further involves the generative artificial intelligence engine being configured to analyze the operator's speech and generate visual and audio effects to enhance the holographic representation. The generative artificial intelligence engine is preferably configured to analyze environmental cues and generate automated responses. The automated responses may include one or more of providing directions, triggering alarms or notifications for the operator or user, and generating interactive art. The system is also configured to operate with a visitor management system to customize holographic interactions based on visitor management system data, such as playing different videos in the holographic display depending on a visitor's interaction with the visitor management system.

The present disclosure provides enhanced realism and engagement in telepresence interactions, enabling dynamic and context-aware responses to environmental cues, and facilitates efficient remote control over multiple holographic projections. The foregoing paragraphs have been provided by way of general introduction and are not intended to limit the scope of the following claims. The described embodiments, together with further advantages, will be best understood by reference to the following detailed description taken in conjunction with the accompanying drawings.

DETAILED DESCRIPTION OF THE INVENTION

Aspects of the present disclosure are best understood by reference to the description set forth herein. All the aspects described herein will be better appreciated and understood when considered in conjunction with the following descriptions. It should be understood, however, that the following descriptions, while indicating preferred aspects and numerous specific details thereof, are given by way of illustration only and should not be treated as limitations. Changes and modifications may be made within the scope herein without departing from the spirit and scope thereof, and the present disclosure herein includes all such modifications.

Figure 1:
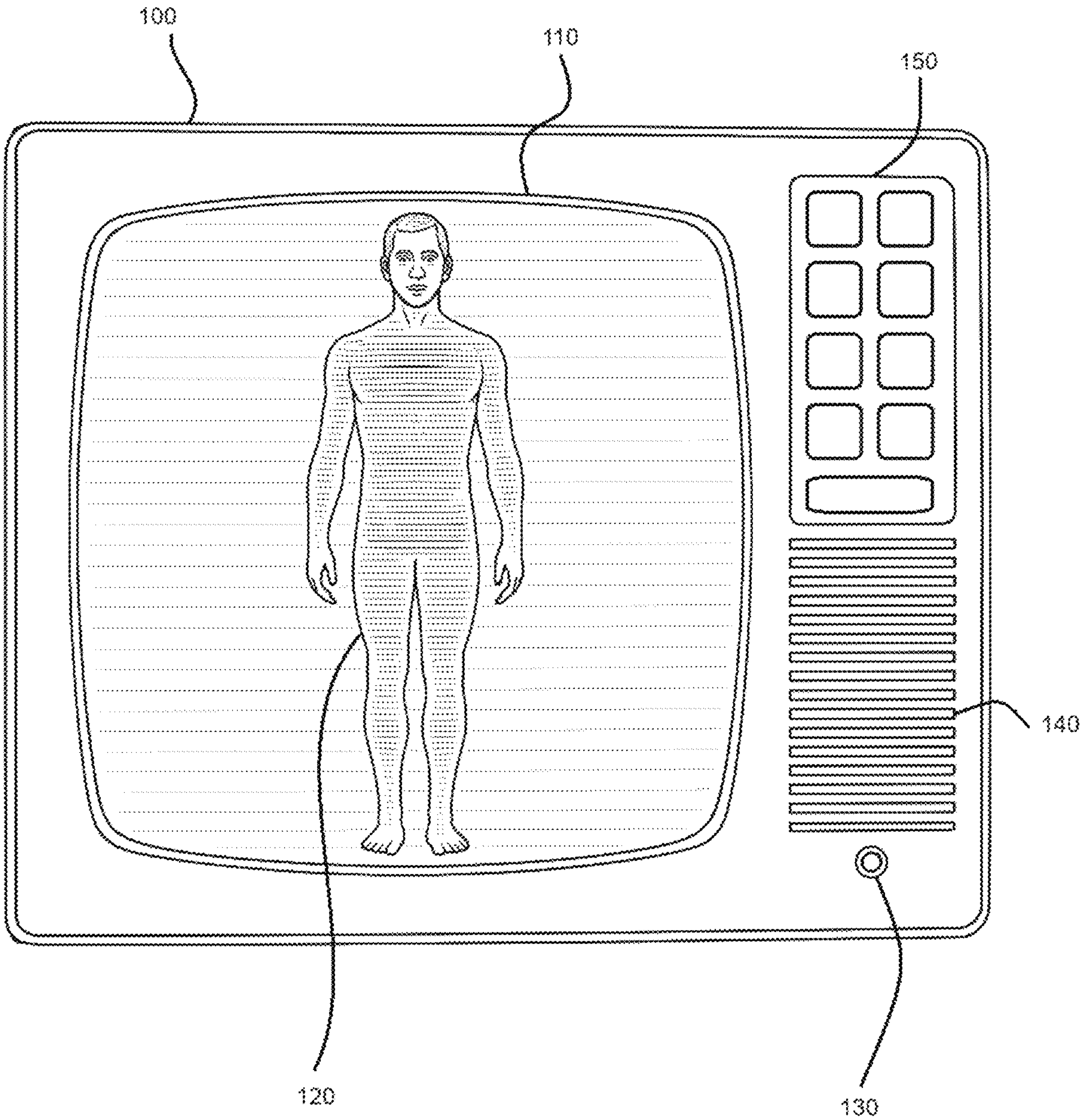
FIG. 1 shows an exemplary embodiment of a monitor displaying a holographic representation.

FIG. 1 illustrates an embodiment of a monitor 100 displaying a holographic representation 120, depicting a localized interactive telepresence unit. The monitor 100 presents a dynamic display area 110, within which a holographic representation 120 is visibly projected, creating the perception of depth for individuals interacting with the system. Situated nearby, a voice sensor 130 is positioned to capture audio input from individuals interacting with the holographic representation 120 and/or environmental audio, facilitating two-way audio communication. Furthermore, a speaker 140 is preferably integrated to relay audio responses originating from the remote operator or the generative artificial intelligence engine, thus enabling the holographic representation 120 to audibly communicate. A control panel 150 is also preferably present, allowing local data entry or interactions with the monitor 100 and its displayed content. The interconnection of these components facilitates real-time, interactive telepresence experiences, where audio and visual data are processed to create a responsive and engaging holographic presence.

The monitor 100 preferably serves as the primary visual interface for displaying the holographic representation 120, employing advanced display technologies to create an illusion of a three-dimensional figure. The monitor 100 may comprise a clear display screen with depth perception capabilities, potentially extending a distance behind the screen to further enhance the perception of depth, such as a box-like structure with a depth that allows for perception of a holographic representation; the depth may be related to the height of the monitor such that a human-sized monitor may be deeper than a smaller monitor. This configuration allows the holographic representation 120 to appear as if standing within the monitor 100, rather than merely on its surface, for example, sitting a few inches, e.g., approximately three inches, off the bottom of the display. Embodiments for the monitor 100 may include transparent OLED displays, volumetric displays, or augmented reality projections that do not necessitate a physical screen, instead projecting directly into space. Additional embodiments for the monitor 100 may incorporate haptic feedback mechanisms to allow users to perceive touch, or directional audio arrays for localized sound projection, further enriching the immersive experience. The monitor 100 can preferably be configured to display different content based on user interaction, such as displaying visual aids or interactive art as part of the generative artificial intelligence enhancement.

The display area 110 designates the active region on the monitor 100 where the holographic representation 120 and associated visual effects are rendered. The display area 110 is where the visual output from the generative artificial intelligence engine is presented, forming the visual component of the interactive telepresence. The dimensions and resolution of the display area 110 can be varied depending on the application, ranging from small, personal interactive units to large-scale public installations. In some embodiments, the display area 110 may incorporate touch-sensitive capabilities, allowing direct user interaction with elements displayed by the holographic representation 120. Various embodiments of the display area 110 may involve dynamic resizing or segmentation, where different sections of the display area 110 can simultaneously present varied information, such as real-time text translations alongside the holographic representation 120. Furthermore, the display area 110 may support multi-user viewing angles, ensuring a consistent holographic experience for multiple individuals simultaneously.

The holographic representation 120 is a dynamically generated visual manifestation of a remote operator or an automated avatar, projected within the display area 110. This representation is preferably enhanced by a generative artificial intelligence engine to provide visual and audio effects that elevate the interactive experience. The appearance of the holographic representation 120 can preferably be dynamically changed to personalize the experience, adjusting elements such as skin tone, dress, accessories, hair color, hair style, makeup, stature, posture, facial expressions, voice, intonation, volume, or background. This adaptability allows the holographic representation 120 to convey varying personas, from more intimidating to more empathetic, depending on the context of the interaction. Embodiments for the holographic representation 120 include a machine-generated avatar that represents a specific or generic operator, or a pre-recorded video of a person that is adjusted in real-time by the artificial intelligence model for mouth movements. Embodiments may include integration with augmented reality glasses worn by local individuals, allowing the holographic representation 120 to appear seamlessly within their physical environment.

The voice sensor 130 is an audio input device preferably integrated with the monitor 100, designed to capture speech and other environmental sounds from individuals interacting with the holographic representation 120. This captured audio data is then transmitted to the generative artificial intelligence engine for analysis, including speech-to-text conversion, translation, and/or analysis of environmental cues. The voice sensor 130 preferably ensures that local individuals can communicate naturally with the holographic representation 120, with their verbal input forming a direct feedback loop into the telepresence system. Embodiments for the voice sensor 130 may include a directional microphone array to minimize background noise and focus on specific speakers, or acoustic sensors capable of detecting sounds such as distress calls or unauthorized access, thereby triggering automated responses. Additional embodiments may involve integrating multiple voice sensors 130 strategically around the display area 110 to achieve enhanced spatial audio capture, improving the accuracy of speech recognition and the detection of environmental cues in crowded or noisy environments.

The speaker 140 functions as an audio output component, preferably delivering spoken responses, audio effects, and other auditory cues generated by the generative artificial intelligence engine or the remote operator. This allows the holographic representation 120 to engage in verbal dialogues and provide information audibly to local individuals. The speaker 140 preferably works in conjunction with the voice sensor 130 to establish a complete two-way audio communication channel. Embodiments for the speaker 140 may include specialized directional speakers that project sound only towards the interacting individual, maintaining privacy and reducing sound bleed in multi-hologram environments. Other embodiments could involve transmitting audio directly to a device of the user for privacy, such as a cellular phone, wireless headphones/earbuds, or other private audio device of the user. Additional embodiments might include a spatial audio system capable of making the sound appear to originate directly from the holographic representation 120 within the display area 110, further enhancing the illusion of presence and realism.

The optional control panel 150 provides a local interface for entering data and/or managing the settings and operations of the monitor 100 and its associated holographic telepresence system. This panel preferably enables local adjustments, such as volume control, brightness settings, or even activating pre-set interactive sequences. The control panel 150 may allow the system to be adapted to specific local conditions or operational requirements without requiring intervention from the remote operator. Alternatively, control or communication may be accomplished via a mobile application accessible via a smartphone or tablet, providing remote control or communication capabilities for local administrators. Another embodiment may feature voice-activated controls, allowing users to verbally interact with the system to adjust settings. Additional embodiments might integrate biometric authentication methods to restrict access to certain functions, enhancing system security and control over sensitive configurations.

Figure 2:
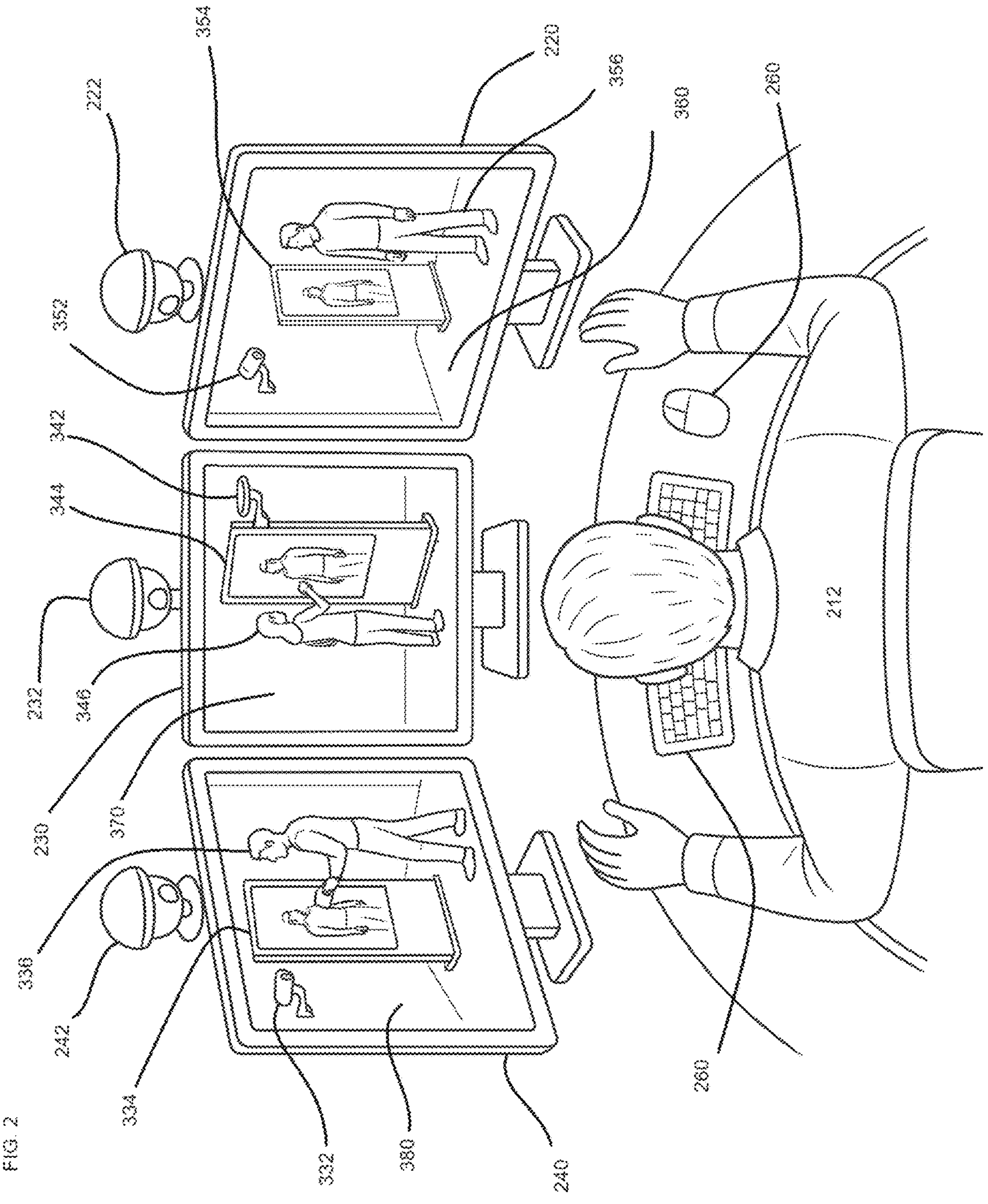
FIG. 2 depicts an exemplary operator workstation with multiple monitors and associated sensors.

FIG. 2 illustrates an exemplary operator workstation, which serves as a centralized hub for a remote operator 212 to oversee and interact with multiple holographic telepresence units located at distinct physical locations. The workstation comprises operator 212, shown as a human figure, interacting with several monitors 220, 230, and 240, each of which displays real-time video feeds from a respective remote holographic projection unit. Each monitor may be associated with a corresponding sensor 222, 232, and 242 (or a lesser number of sensors and/or monitors may be used), designed to capture aspects of the remote environment. Use of one sensor per monitor may be preferable for ergonomic and operator intuition purposes, as an operator may be looking more directly at a sensor that is associated with the image on a particular monitor. Alternatively, images may be shifted when a particular location is active, such that the active location will always be displayed on a main monitor that is associated with a sensor. The operator 212 preferably also utilizes input/output devices 260 to control the holographic units and communicate with individuals at the remote locations. This setup allows the operator 212 to monitor diverse environments and engage in real-time holographic interactions.

The operator 212 represents the individual or entity that manages and interacts with the holographic telepresence system from a remote area. While typically a human, the operator 212 may, in some embodiments, partially or fully comprise generative artificial intelligence algorithms or machine learning algorithms, enabling autonomous or semi-autonomous operation of the holographic projections. The operator 212 monitors activity at multiple or single remote locations through the display screens at the operator workstation. The operator 212 can also be a combination of human supervision with artificial intelligence assistance for routine tasks or enhanced responsiveness. Alternative embodiments may involve a team of operators sharing oversight of numerous holographic units, with tasks distributed based on workload or specialization. Additional embodiments may include operators situated in mobile command centers, allowing for flexible deployment and management of the telepresence network in various environments. In high load situations, it may be possible to remotely network further operators to handle a surge in volume; such operators can be disconnected when volume of interactions returns to a lower level that can be managed by fewer operators.

Monitor 220, monitor 230, and monitor 240 are display screens at the operator workstation, configured to show real-time feeds from cameras positioned at various physical locations of the hologram projection units. These monitors preferably provide the operator 212 with visual situational awareness of the remote environments, enabling informed decision-making and interaction. Each monitor may display a separate feed, or a single monitor could be partitioned to display multiple feeds simultaneously; feeds may be shifted between monitors based on operator commands or automatic triggers. For example, if a single location is active while other locations are inactive, the feed from the active location may be shifted to a primary monitor. Alternative embodiments for these monitors include large-format video walls for comprehensive oversight of numerous locations, or virtual reality/augmented reality headsets that provide an immersive view of the remote environments, allowing the operator 212 to feel more present in the distant physical spaces. Additional embodiments might integrate interactive overlays on the video feeds, providing the operator 212 with contextual information or control options directly within the visual display. For example, a user's identification information or other relevant data pertaining to the individual might be accessible to or displayed to the operator. Monitors 220, 230, and 240 are depicted in FIG. 2 as displaying side or back views of users in locations 380, 370, 360. However, the data collected by sensors 332, 342, 352 may alternatively be used to display the users to the operator 212.

The sensor 222, sensor 232, and sensor 242 are preferably associated with their respective monitors 220, 230, and 240, and are configured to capture environmental data or cues from the remote holographic projection units. These sensors preferably include video cameras for visual input and microphones for audio input, and may also include other environmental sensors such as infrared, motion, or proximity sensors. The data captured by these sensors preferably provides the generative artificial intelligence engine with context about the operator environment, enabling dynamic responses and enhancements to the holographic representation. Additionally, these sensors may include advanced lidar or radar systems for detailed spatial mapping of the remote environment, or biometric sensors to detect emotional states or physical conditions of operator.

The input/output devices 260 represent the various tools and interfaces that may be used by the operator 212 to control the holographic telepresence system and interact with remote individuals. These devices may include a control interface such as a tablet, a keyboard, a mouse, or a joystick. They may also encompass capture systems like a green screen or similar setup for capturing the operator's image and voice, which are then processed for use with the remote hologram projection units. The input/output devices 260 preferably allow the operator 212 to activate specific hologram projection units, send commands, and communicate directly or indirectly through the generative artificial intelligence engine. Alternative embodiments for input/output devices 260 may include advanced gestural control systems, eye-tracking interfaces, or neural input devices that translate mental commands into system actions. Additional embodiments might integrate haptic feedback gloves or suits, allowing the operator 212 to experience tactile sensations from the remote environment or to provide additional data for the holographic representation.

Figure 3:
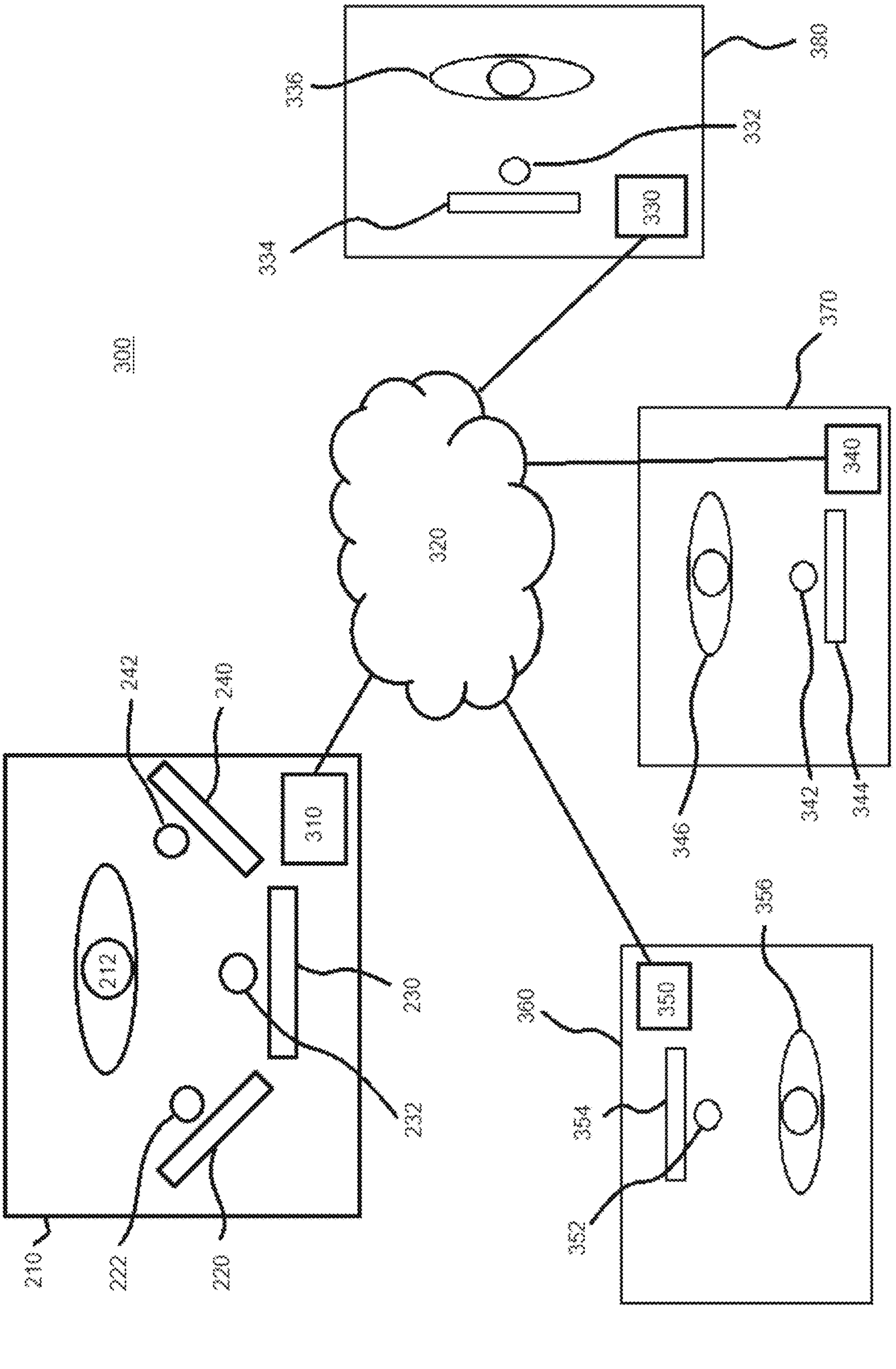
FIG. 3 is a schematic view of at least a portion of an example implementation of a system for remote interaction via holographic telepresence.

FIGS. 2 and 3 presents an exemplary system 300 for remote interaction via holographic telepresence, illustrating how a remote operator 212, located in a remote area 210, can interact with multiple persons 336, 346, and 356 situated in distinct physical areas 360, 370, and 380. The operator 212 preferably monitors these remote locations through monitors 220, 230, and 240, each preferably connected to corresponding sensors 222, 232, and 242. All operator equipment preferably connects to a processing system 310, which preferably communicates with remote processing devices 330, 340, and 350 via a network 320. Each remote processing device 330, 340, and 350 is preferably linked to a local sensor (332, 342, 352) and a monitor (334, 344, 354) that preferably displays a holographic representation to the respective persons 336, 346, and 356. This configuration enables real-time data flow and control for interactive holographic experiences across geographically dispersed locations.

The system 300 represents an exemplary embodiment of the comprehensive infrastructure for interactive holographic telepresence, designed to facilitate real-time control and interaction between a remote operator and multiple holographic projections. The system 300 integrates various hardware and software components, including those at the operator station and at the remote hologram projection units, all orchestrated by a generative artificial intelligence engine. The operational flow within the system 300 preferably involves the capture of the operator's image and voice, transmission to selected hologram locations, and enhancement of the holographic representation through artificial intelligence. Alternative embodiments of the system 300 may involve a decentralized architecture where each hologram unit operates with a greater degree of autonomy, or a cloud-based system where processing power is distributed across multiple servers rather than a local processing system 310. Additional embodiments for the system 300 might incorporate machine learning models for predictive analytics, anticipating user needs or environmental changes to proactively adjust holographic interactions.

The remote area 210 signifies the geographical or virtual space where the operator 212 is located, physically distinct from the areas 360, 370, and 380 where the holographic projections are displayed. This spatial separation underscores the telepresence aspect of the system 300, allowing an operator to oversee and engage with users in distant locations without physical travel. The remote area 210 can be a dedicated control room, a home office, or even a mobile platform, if it provides the necessary connectivity and equipment for the operator 212.

The processing system 310 preferably acts as a central computational hub within the system 300, responsible for managing the flow of data between the operator workstation and the remote hologram projection units. The processing system 310 preferably incorporates the generative artificial intelligence engine, which preferably processes real-time data from the operator's video feed, audio input, and environmental sensors at each of areas 360, 370, 380. The processing system 310 preferably generates enhanced holographic representations, visual and audio effects, and interactive responses based on this data. Alternative embodiments for the processing system 310 include distributed computing architectures, where processing tasks are shared among multiple interconnected servers, or edge computing deployments, where processing occurs closer to the data sources to reduce latency. Embodiments may integrate quantum computing elements for parallel processing of complex artificial intelligence models, substantially increasing the speed and sophistication of holographic generation and response.

The network 320 provides the communication backbone that connects the operator station at location 210 to the hologram projection units 334, 344, 354, enabling real-time data transmission and control. The network 320 can be wired or wireless, and may utilize the Internet, private networks, or a combination thereof. The integrity and speed of the network 320 are important for maintaining low-latency interactions and high-fidelity holographic projections. Embodiments of the network 320 may include dedicated fiber optic connections for maximum bandwidth and minimal delay, 5G/6G cellular networks for robust wireless connectivity in mobile or remote deployments, or other suitable networking technologies. Additional embodiments might incorporate satellite communication systems for global reach, or mesh networks for increased resilience and fault tolerance in challenging environments, ensuring continuous operation of the interactive holographic telepresence system.

The processing device 330, processing device 340, and processing device 350 are preferably localized computing units situated at each remote physical location 360, 370, 380, responsible for receiving enhanced video feeds from the processing system 310 and rendering them as holographic representations on their respective monitors 354, 344, 334. These devices also preferably manage the local sensors 332, 342, 352 and transmit captured data back to the processing system 310. The processing devices ensure smooth and responsive holographic projection, acting as the interface between the central artificial intelligence and the physical environment. Embodiments for processing devices 330, 340, 350 may include embedded systems optimized for graphic rendering, or miniature single-board computers for compact and cost-effective deployment. Additional embodiments may involve highly specialized graphical processing units (GPUs) within each processing device 330, 340, 350 to handle advanced real-time rendering tasks, such as complex visual effects or photorealistic holographic animations with reduced latency.

The sensor 332, sensor 342, and sensor 352 are deployed at the remote physical locations (areas 360, 370, 380), preferably capturing real-time data about the surrounding environment and the persons 336, 346, 356 interacting with the holograms. These sensors gather information such as movement, proximity, audio cues (e.g., a human asking a question), and other environmental factors; sensors preferably include at least a video capture device and an audio capture device. This data is preferably transmitted to the generative artificial intelligence engine for analysis, triggering automated responses or enhancing the holographic interaction. Embodiments of these sensors may include advanced biometric scanners to identify individuals or RFID chip readers that sense personal devices, allowing for personalized holographic experiences. Additional embodiments might integrate specialized sensors for weapon detection, temperature monitoring, or air quality analysis, expanding the range of automated responses and security applications for the system.

The monitor 334, monitor 344, and monitor 354 are the display units at the remote locations, analogous to monitor 100 in FIG. 1, responsible for projecting the holographic representations to the persons 336, 346, 356. These monitors receive the enhanced video feeds from their respective processing devices 330, 340, 350 and render the dynamic holographic images. Each monitor is configured to create a lifelike representation for interaction, often using a transparent display screen with depth perception. Embodiments for monitors 334, 344, 354 may include large transparent screens for public spaces, or smaller, portable holographic projectors for mobile or personal assistant applications. Holographic projections may be configured in a personal manner, such as a child hologram for a child or an adult hologram for an adult. Additional embodiments may involve multi-panel display systems that create an even larger and more immersive holographic environment, providing a wider field of view for individuals interacting with the holographic presence, and may provide for multiple simultaneous holographic representations.

The person 336, person 346, and person 356 represent the individuals interacting with the holographic telepresence system at the remote physical locations. These persons engage with the holographic representations projected by monitors 334, 344, and 354, and their speech/audio, actions/motions, and environmental cues are preferably captured by sensors 332, 342, and 352. The system is preferably designed to provide interactive and personalized experiences for these individuals, adapting the holographic representation and responses based on real-time analysis. Embodiments for interaction with persons 336, 346, 356 may include systems that track their gaze or emotional state to tailor the holographic experience, or devices that provide haptic feedback when they interact with the holographic projection. Additional embodiments could incorporate wearable sensors worn by persons 336, 346, 356 to monitor their physiological responses, allowing the holographic representation to adjust its demeanor or content based on the person's stress levels or engagement.

The area 360, area 370, and area 380 denote the distinct physical locations where the hologram projection units are deployed, and where persons 336, 346, 356 interact with the holographic representations. These areas can be diverse, such as airports, train stations, information desks, amusement parks, stadiums, hospitals, doctors' offices, or shopping malls, each potentially having specific environmental cues and interaction requirements. The system's flexibility allows for deployment in various contexts, from security screening to customer service or entertainment. Alternative embodiments for areas 360, 370, 380 include virtual reality environments where the physical hologram units are replaced by digital avatars, or mobile deployment zones that move with a specific event or person, such as a personal assistant hologram that follows an individual. Additional embodiments might involve interactive architectural spaces, where the entire environment can dynamically change in response to holographic interactions, such as altering lighting or displaying information on walls.

Figure 4:
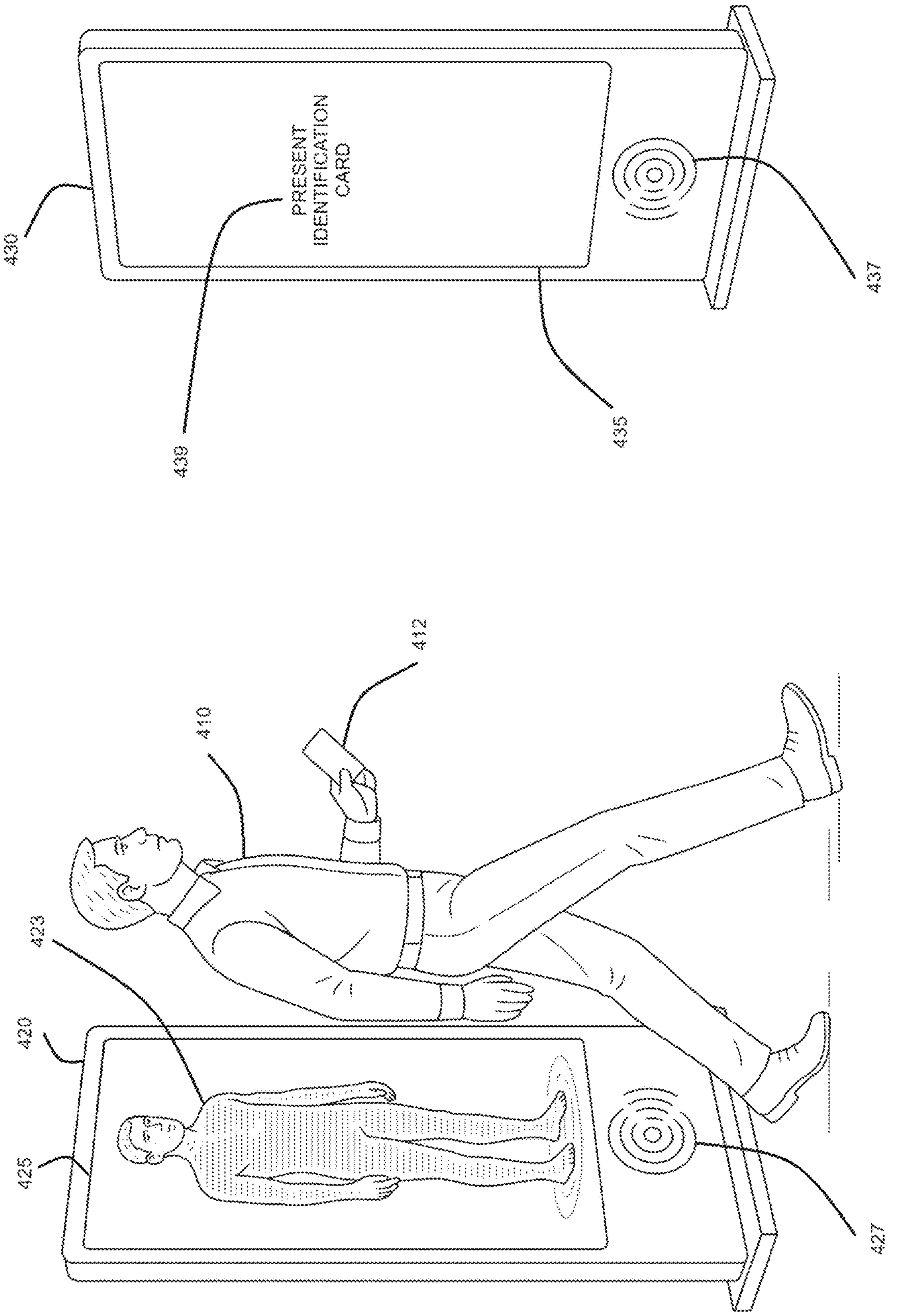
FIG. 4 depicts an exemplary multiple monitor system for interactive holographic display with presence sensing.

FIG. 4 displays an embodiment of a multiple monitor system 400 for interactive holographic display with identification features. A person 410 is depicted as interacting with monitor 420 and proceeding toward monitor 430. The person 410 possesses an RFID card 412 or other identification which may be sensed by a sensor 427 associated with monitor 420 or by sensor 437. Monitor 420 features a display area 425 and displays a holographic representation 423. Similarly, monitor 430 includes a display area 435 and displays a message 439, and is associated with sensor 437. This arrangement illustrates how identification technologies, for example RFID tags and sensors, can personalize or trigger specific holographic interactions and messages, enabling a tailored telepresence experience for individuals based on their identity or access credentials within the system.

The multiple monitor system 400 represents an exemplary deployment scenario in which several holographic displays are co-located or distributed within a single facility, all preferably managed by the interactive holographic telepresence system. The multiple monitor system 400 allows for concurrent or sequential interactions with various holographic representations, potentially catering to different purposes or individuals. The ability to manage multiple displays efficiently is a feature that enhances the system's utility in environments with varying traffic levels. The multiple monitor system 400 may be a modular design in which units may be easily added or removed to scale operations, or a distributed processing architecture where each monitor has localized artificial intelligence processing capabilities for increased autonomy.

The person 410 is an individual interacting with the multiple monitor system 400, similar to persons 336, 346, or 356 described previously in FIG. 3. The interaction of person 410 with the holographic displays is preferably enhanced by identification methods, such as the use of an RFID card 412, allowing for personalized experiences. The system can preferably adapt the holographic representation or trigger specific content based on the identity or profile associated with person 410. The system may alternatively employ biometric authentication, such as facial recognition or fingerprint scanning, to identify individuals and retrieve their personalized settings. Alternatively, the system may use mobile application integration, where person 410's smartphone provides identification and preferences to the system.

The card 412 may be a radio-frequency identification device (RFID) carried by person 410 or another method of identification, used for proximity-based identification and personalization within the system 400. When the card 412 comes within range of a sensor, such as sensor 427 or sensor 437, it can trigger specific holographic content, personalized greetings, or access-controlled interactions. This mechanism can allow the system to recognize individuals and provide tailored services, such as playing a customized video or displaying a personalized hologram. Alternative embodiments for the card 412 may include Near Field Communication (NFC) tags, QR codes, digital identification stored on a smartphone, or even scannable identification cards, providing alternative means of contactless or proximity-based identification.

The monitor 420 and monitor 430 are holographic display units within the multiple monitor system 400, similar to monitor 100 in FIG. 1 and monitors 334, 344, 354 in FIG. 3. These monitors preferably project holographic representations and messages to the interacting person 410. The monitors 420 and 430 can operate independently or in conjunction, displaying different content or providing sequential interactions. For example, monitor 420 might display an initial holographic greeting triggered by the RFID card 412, while monitor 430 subsequently presents specific directions or information as message 439. Alternative embodiments for monitors 420 and 430 include transparent LED screens or projection systems that create holographic effects on specialized films. Additional embodiments might integrate dynamic content generation capabilities directly into the monitors, allowing them to adapt displayed information even in the absence of constant central system communication, enhancing system resilience.

The holographic representation 423 is the visual projection displayed on monitor 420, preferably representing the remote operator or a generative artificial intelligence-powered avatar. Similar to holographic representation 120 in FIG. 1, the holographic representation 423 is preferably dynamic and interactive, enhanced by artificial intelligence to provide visual and audio effects. The specific content or appearance of holographic representation 423 can be customized based on the identification of person 410 through card 412, for example, displaying a child hologram for a child or an adult hologram for an adult, and possibly adapting other holographic features to the person 410. It is preferable to incorporate real-time facial expressions and body language from operator 212 into holographic representation 423, providing a more authentic and emotionally resonant telepresence. Alternative embodiments for holographic representation 423 may include pre-recorded video sequences that are dynamically modified by artificial intelligence for speech synchronization, or purely computer-generated avatars that offer a greater range of stylized appearances and animations.

The display area 425 and display area 435 indicate the visual regions on monitor 420 and monitor 430, respectively, where the holographic content is rendered. These display areas are where the holographic representation 423 and messages such as message 439 are presented, and they are designed to offer a sense of depth and realism for the interacting individuals. The content within display area 425 and display area 435 can be highly dynamic, reacting to the person 410's presence, speech, or identification. Embodiments for display area 425 and display area 435 include interactive surfaces that respond to touch gestures, or adaptive layouts that reconfigure based on the type of information being presented, such as shifting from a full-body hologram to a detailed data display.

Sensor 427 and sensor 437 are preferably identification sensors associated with monitor 420 and monitor 430, respectively. These sensors 427, 437 preferably detect the presence of person 410 by receiving information from card 412, triggering appropriate holographic interactions. These sensors 427, 437 may also capture environmental cues and audio input from the person 410 to feed into the generative artificial intelligence engine for analysis and response generation. Sensors 427 and 437 may include a variety of proximity sensors, such as ultrasonic, optical, or thermal sensors, to detect the presence and movement of individuals. Additional embodiments could incorporate advanced vision systems that use artificial intelligence to recognize persons or even to recognize gestures or emotional states of person 410, providing a more nuanced understanding of their interaction with the holographic display.

Message 439 is an exemplary visual or auditory output presented by monitor 430, which can be statically or dynamically generated. Message 439 might provide instructions, directions, security alerts, product information, or personalized greetings. For example, in a visitor management system (VMS), message 439 might change based on the stage of the check-in process. Message 439 may feature multi-language support, wherein the system dynamically translates messages based on the identified language preference of person 410. Additional embodiments might involve interactive elements within message 439, such as tappable or clickable links or scannable QR codes, allowing person 410 to access further information or services through personal devices.

Figure 5:
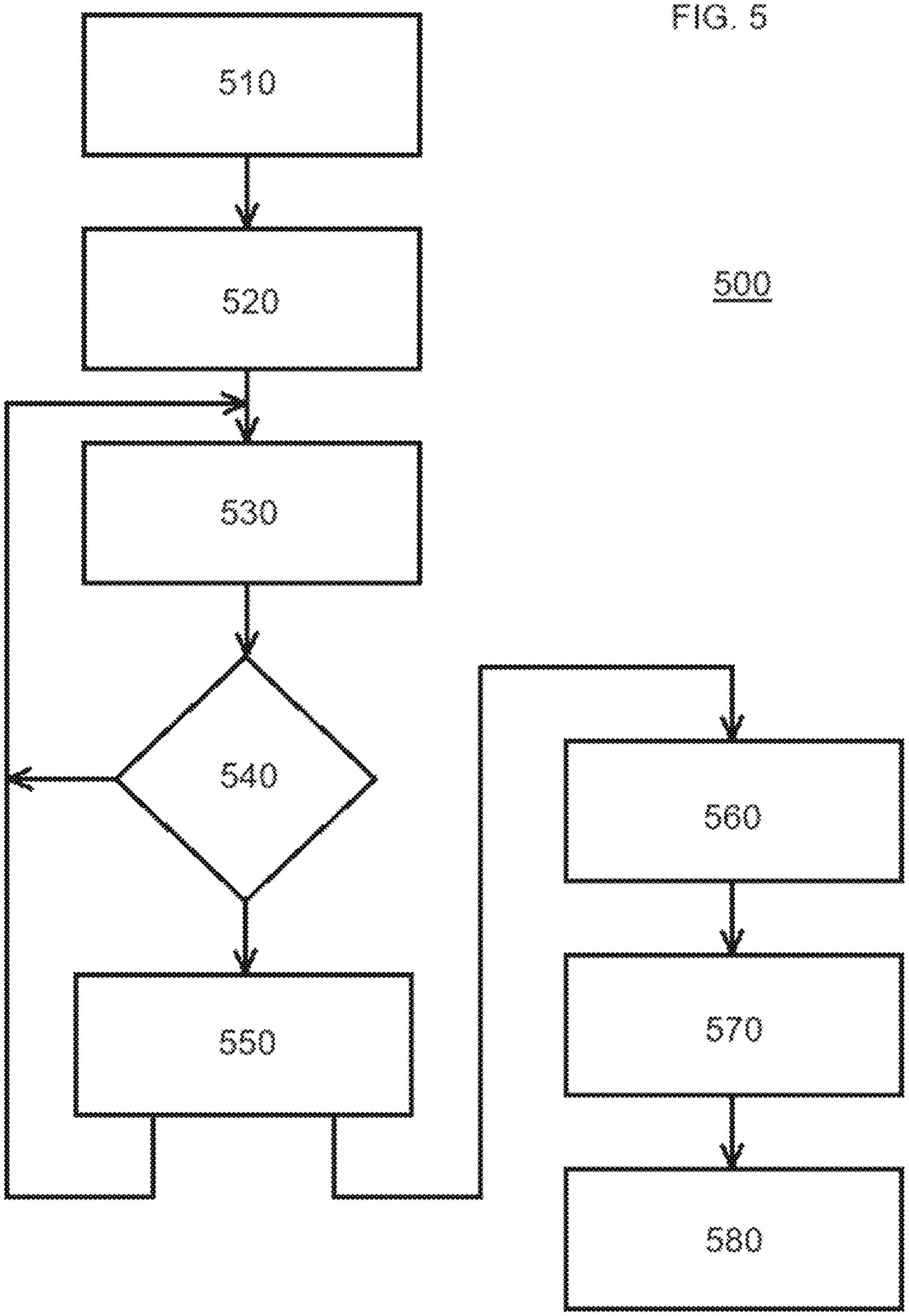
FIG. 5 shows a flow chart representing an exemplary mouth movement capture process.

FIG. 5 presents an exemplary embodiment of a mouth movement capture flow 500, detailing a method for extracting and integrating an operator's mouth movements into a holographic representation in accordance with various embodiments of the invention in which the operator's mouth movements are integrated into a holographic representation presented to a user. The process 500 preferably begins with recording video step 510, where a video feed of an operator 212 is captured. Subsequently, a recognize mouth step 520 identifies the operator's mouth within the video. This is followed by a track mouth step 530, which continuously monitors the mouth's position and movements. A movement detected decision point 540 evaluates if relevant mouth movement occurs. If not, tracking continues; if so, a capture step 550 records the movement data. This captured data is then provided to artificial intelligence step 560 for further analysis. A separate mouth step 570 isolates the mouth movement data, which is preferably then integrated into the holographic representation during integration step 580, often in conjunction with audio and/or text data, to create a lifelike speaking hologram even without a live video feed.

The recording video step 510 preferably involves capturing a video feed of the operator 212 at the operator station. This video feed serves as the initial raw data for extracting mouth movements and potentially other facial expressions. The recording can be performed using various camera systems, from standard webcams to high-definition video cameras, including 360-degree cameras to capture a broader context. The quality and resolution of the recorded video impact the accuracy of subsequent mouth movement recognition and tracking. Recording video step 510 may include capturing video using multiple camera angles to ensure comprehensive coverage, or utilizing specialized cameras that record depth information for more precise 3D facial modeling. Additional embodiments might involve incorporating thermal imaging cameras to detect subtle facial expressions related to emotional states, further enhancing the expressiveness of the holographic representation.

The recognize mouth step 520 employs software or an artificial intelligence model to identify the location of the operator's mouth within the captured video frames from recording video step 510. This step utilizes computer vision techniques to detect facial features and precisely locate the mouth region. Accurate mouth recognition is a prerequisite for effective tracking and subsequent motion extraction. Alternative embodiments for recognize mouth step 520 include employing deep learning models trained on large datasets of facial images, or using template matching algorithms for faster, though potentially less robust, mouth detection. Additional embodiments might involve incorporating active shape models or active appearance models for more adaptive and accurate mouth recognition across varying lighting conditions and facial orientations, improving the overall reliability of the system.

The track mouth step 530 preferably continuously monitors and follows the movements of the recognized mouth across sequential video frames. This tracking process preferably generates a stream of data describing the mouth's position, shape, and deformation over time, which is useful for animating the holographic representation's speech. Additional embodiments might integrate 3D facial reconstruction techniques to track the mouth in three dimensions, providing more accurate and natural-looking lip synchronization for the holographic representation.

The movement detected decision point 540 is a logical stage where the system determines if there are significant changes in mouth movement that warrant further processing. If no relevant and substantial movement is detected, indicating that the operator 212 is not speaking or expressing, the system may loop back to the track mouth step 530 to continue monitoring. This decision point 540 preferably helps to optimize processing resources by only acting on relevant motion data. This decision point 540 might employ software to distinguish between intentional speech movements and incidental facial twitches. Additional embodiments might dynamically adjust the sensitivity of movement detection based on the context of the interaction or the operator's known speaking patterns, allowing for a more responsive and intelligent system.

The capture step 550 records the detected mouth movement data when relevant and significant movement is identified at movement detected decision point 540. This data, which can include coordinates, velocities, and deformation parameters, is preferably prepared for submission to the artificial intelligence engine. The capture step 550 preferably ensures that only meaningful articulation data is collected, reducing noise and computational overhead. Additional embodiments might involve capturing not only mouth movements but also subtle surrounding facial muscle activations to render more expressive and emotionally aligned holographic representations.

The "provide to artificial intelligence" step 560 transmits the captured mouth movement data to a generative artificial intelligence model for further processing and enhancement. This artificial intelligence model is preferably configured to refine the raw movement data, generate realistic mouth animations, and synchronize these with audio input. The artificial intelligence model may also be responsible for ensuring the mouth movements appear natural and convey the intended speech.

The "separate mouth" step 570, preferably performed by the artificial intelligence model, preferably isolates the mouth movement data from other video elements. This separation is important for cleanly applying the mouth movements to the holographic representation. This step 570 enhances the ability of the generative artificial intelligence to manipulate the mouth region independently for accurate lip synchronization.

The integration step 580 combines the processed mouth movement data with the holographic representation, preferably along with corresponding audio and/or text data. This final step preferably generates the complete visual and auditory output for the hologram, making it appear as if the holographic representation is speaking in synchronization with the operator's voice. This integration creates the lifelike illusion that a person is present and talking. Embodiments for integration step 580 may include real-time rendering engines that blend the mouth animations seamlessly with the holographic avatar's facial texture. Additional embodiments might involve incorporating dynamically generated tongue and teeth movements based on phoneme analysis, further enhancing the realism of speech articulation within the holographic representation.

Figure 6:
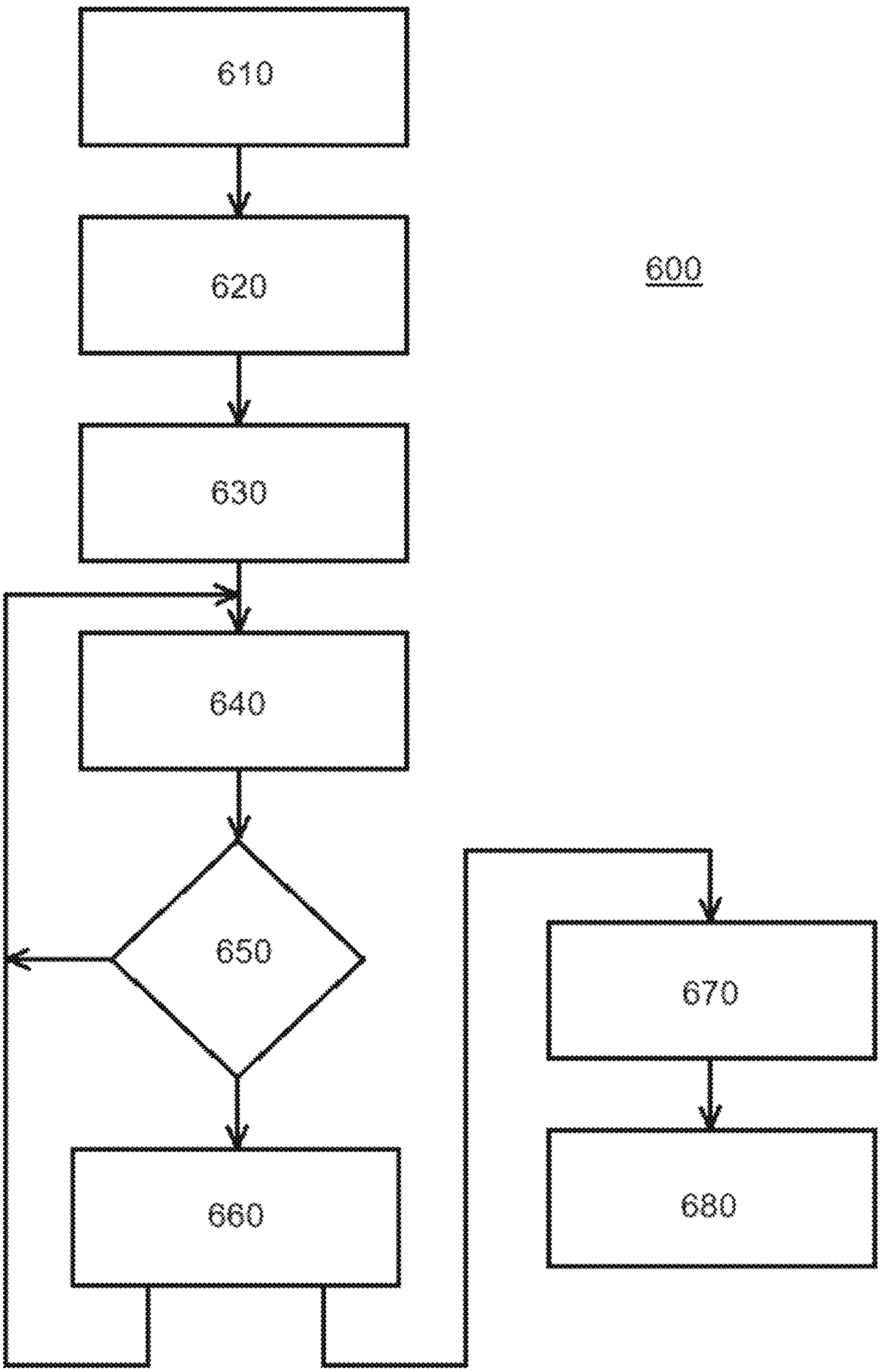
FIG. 6 provides a flow chart illustrating an exemplary full body capture process.

FIG. 6 illustrates an exemplary embodiment of a full body capture flow 600, outlining a method for capturing an operator's complete body and mouth movements for integration into a holographic representation. The process begins with recording video step 610, capturing a video of the operator. Following this, a recognize body step 620 identifies the operator's body, and a recognize mouth step 630 locates the mouth within the recognized body. These recognized features are then preferably continuously monitored in a track body and mouth step 640. A movement detected decision point 650 checks for relevant body or mouth movement; if detected, the video data is provided to artificial intelligence step 660. The artificial intelligence model then performs an extract wireframe and facial data step 670, extracting detailed movement information. Finally, an integration step 680 combines this extracted data with the holographic representation, enabling a full-body animated hologram.

The recording video step 610 captures a comprehensive video feed of the operator with an emphasis on capturing the entire body. This might require cameras with a wider field of view or multiple cameras positioned to cover the operator's full range of motion. The recorded video preferably serves as the source for extracting both body posture and detailed facial movements. The quality of this recording directly impacts the fidelity of the full-body holographic representation. Alternative embodiments for recording video step 610 include using motion capture suits equipped with inertial measurement units or optical markers for precise body tracking. Additional embodiments might involve 360-degree video capture setups to allow for a comprehensive and dynamic perspective of the operator's movements, providing more versatile input for the holographic representation.

The recognize body step 620 preferably utilizes computer vision and artificial intelligence algorithms to identify and segment the operator's body within the video feed captured during recording video step 610. This involves distinguishing the operator's form from the background, often using techniques such as background subtraction, skeletal tracking, or pose estimation. Accurate body recognition is often important for generating a realistic full-body holographic representation. Alternative embodiments for recognize body step 620 include deep learning models trained for human pose estimation, or specialized hardware sensors such as depth cameras (e.g., LiDAR or structured light sensors) that provide 3D data of the body. Additional embodiments might involve leveraging multiple camera views to reconstruct a volumetric model of the operator's body, enabling more accurate and robust body recognition across various postures and movements.

The recognize mouth step 630 specifically locates the operator's mouth within the facial region, after the body has been recognized. This step is similar to recognize mouth step 520 in FIG. 5 but operates within the context of a full-body video. By first identifying the body and then the face, the system can more accurately isolate the mouth, even with varying body orientations or movements. Alternative embodiments for recognize mouth step 630 include dedicated artificial intelligence models optimized for facial landmark detection, or integration with existing facial recognition systems that provide precise mouth coordinates. Additional embodiments might employ a cascaded approach where a general face detection model is first applied, followed by a specialized mouth detection model to enhance accuracy and reduce computational load.

The track body and mouth step 640 preferably continuously monitors and tracks both the operator's overall body movements and specific mouth movements across video frames. This combined tracking is more complex than just mouth tracking (track mouth step 530) as it involves correlating multiple moving parts of the body and face. The data generated from this step includes skeletal joint positions, body orientation, and facial animation parameters. Additional embodiments might involve integrating data from wearable sensors on the operator to augment video-based tracking, providing more precise and robust tracking of subtle body and mouth movements.

The "movement detected" decision point 650 evaluates whether relevant and significant body or mouth movements are occurring, indicating active interaction from the operator. If no such movement is detected, the system continues to loop back to the track body and mouth step 640 to conserve processing resources. If movement is present, the system proceeds to provide the video data to the artificial intelligence engine. This decision point 650 preferably ensures that the system responds efficiently to active input from the operator 212. Various embodiments might implement adaptive thresholds for movement detection that dynamically adjust based on the current context of the holographic interaction or the operator's predefined activity profile.

The "provide to artificial intelligence" step 660 sends the captured video data, including both body and mouth movements, to the generative artificial intelligence model for comprehensive processing. The artificial intelligence model is designed to analyze complex human motion. The artificial intelligence model preferably plays a central role in transforming raw video input into a compelling holographic representation.

The "extract wireframe and facial data" step 670, performed by a generative artificial intelligence model, preferably extracts specific data points and structures from the video feed. This preferably includes generating a wireframe model of the operator's body, which captures skeletal movements and posture, and detailed facial data for animating expressions and lip synchronization. This separation and extraction process is often important for reconstructing a dynamic and expressive holographic representation. Various embodiments might involve extracting subtle nuances of movement, such as breathing patterns or micro-expressions, to enhance the realism and emotional depth of the holographic representation.

Integration step 680 preferably combines the extracted wireframe data and facial movement data with the holographic representation. This final stage renders a complete, animated, full-body hologram that accurately reflects the operator's movements and expressions. Integration step 680 preferably ensures that the holographic representation appears natural and responsive to the operator's actions, providing a fully immersive telepresence experience. Additional embodiments might involve incorporating real-time environmental interactions, such as shadows or reflections cast by the holographic representation within the physical space, further blurring the line between virtual and real presence.

Figure 7:
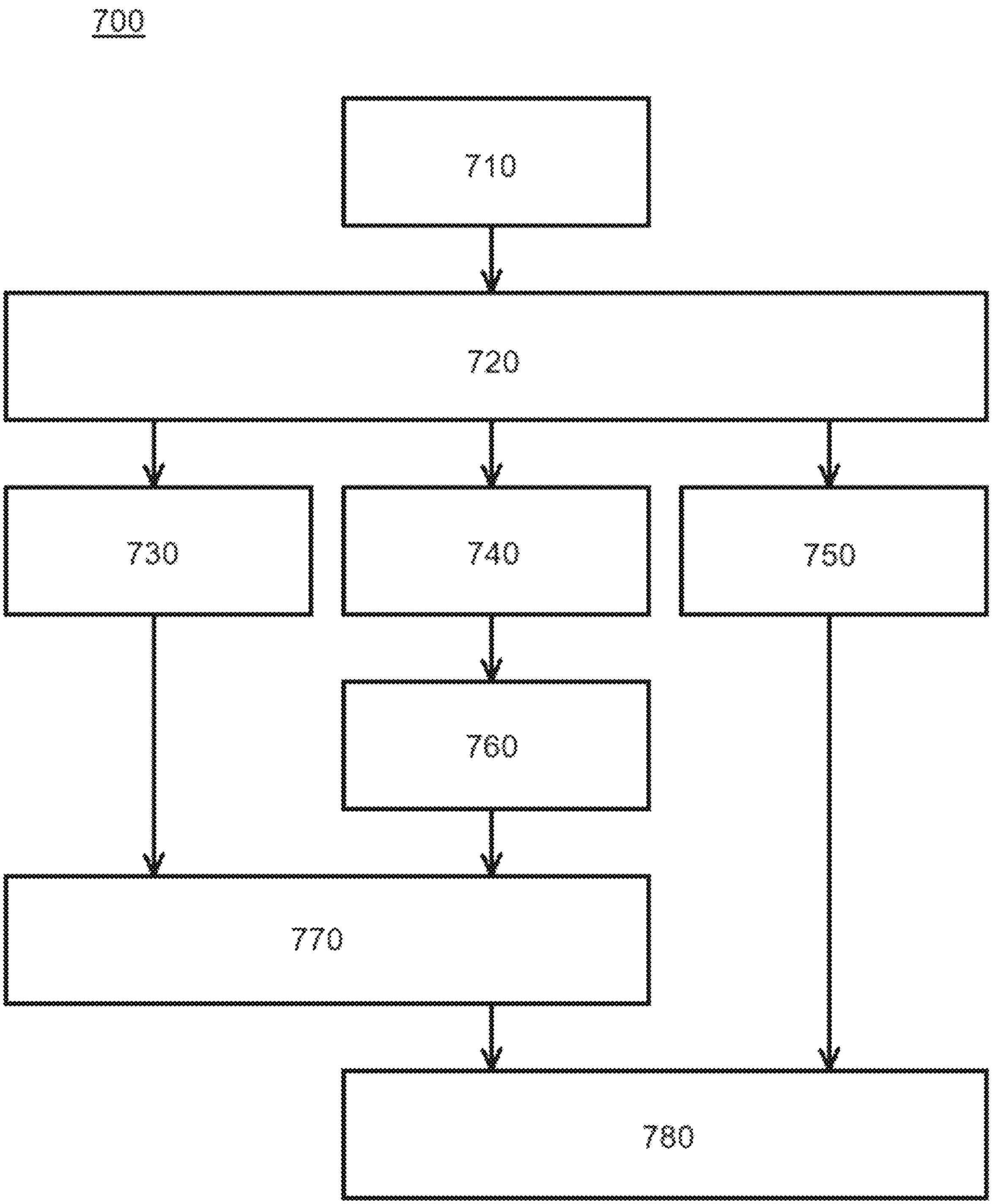
FIG. 7 depicts a flow chart illustrating an exemplary video and text integration process.

FIG. 7 outlines an embodiment of a preferred video and text integration flow 700, illustrating how various data streams may be processed and combined to create an interactive holographic representation that incorporates both visual and textual elements. The process begins with capture video step 710, where an operator's video feed is recorded. This video data is then sent to artificial intelligence in step 720 for initial processing. From there, the artificial intelligence extracts mouth movement at step 730, extracts speech audio at step 740, and extracts a wireframe at step 750, in parallel. The extracted speech audio at step 740 is then preferably converted to text at step 760. Subsequently, the extracted mouth movement 730, speech audio 740, and converted text 760 are preferably synchronized in a synchronize movement, audio, and text step 770. Finally, this synchronized data, along with the extracted wireframe data 750, is preferably combined into the holographic representation during integration step 780, enabling dynamic visual output via the hologram and corresponding textual output where desired.

The capture video step 710 involves acquiring the operator's video and audio feed. This step is the initial input for the entire integration flow, providing the raw visual data of the operator's expressions and movements. Embodiments for capture video step 710 may include using multiple synchronized cameras to capture different angles of the operator, or employing specialized cameras with high frame rates to capture rapid movements more precisely. Additional embodiments might involve using cameras with built-in depth sensors, providing additional three-dimensional information that can enhance the realism of the wireframe and mouth movement extraction.

The "send data to artificial intelligence" step 720 transmits the captured video data to one or more generative artificial intelligence models for analysis and feature extraction. This centralized processing allows one or more artificial intelligence models to simultaneously work on different aspects of the video, such as facial movements, audio cues, and body posture. Additional embodiments might involve a hierarchical artificial intelligence architecture where initial processing occurs at the edge device, and then refined data is sent to a central artificial intelligence for complex generative tasks.

The extract mouth movement step 730, performed by an artificial intelligence model, isolates the relevant movements of the operator's mouth from the video data, similar to separate mouth step 570 in FIG. 5. This involves tracking the mouth's shape and position. This data is often important for causing the holographic representation to appear to be talking. Additional embodiments might incorporate an analysis of the operator's speech phonemes to predict and generate mouth movements, allowing for more natural and expressive holographic articulation even when the video feed is less clear.

The extract speech audio step 740 preferably uses an artificial intelligence model to extract the operator's spoken words and other relevant audio from the audio component of the video feed. This involves separating speech from background noise and other sounds, ensuring that the vocal input is clear for subsequent processing. The extracted speech audio is then used for both text conversion and as the audio output for the holographic representation. Additional embodiments might involve integrating real-time voice modification artificial intelligence models to adjust the pitch, tone, or emphasis of the operator's voice, creating specific emotional effects for the holographic representation.

The extract wireframe step 750, preferably executed by an artificial intelligence model, generates a wireframe model of the operator's body from the video input, similar to part of extract wireframe and facial data step 670 in FIG. 6. This wireframe preferably captures the skeletal structure and posture, allowing the holographic representation to mimic the operator's physical movements. This provides portions of a foundational structure for a full-body holographic projection. Additional embodiments might incorporate artificial intelligence models that can infer muscle activation and soft-body dynamics from the wireframe, making the holographic movements appear more fluid and biomechanically accurate.

The "convert speech to text" step 760 preferably uses an artificial intelligence model to transform the extracted speech audio into text. This allows for displaying closed captioning or for enabling text-based interactions with the holographic system. The artificial intelligence model can also optionally translate the speech into different languages, expanding the system's global applicability. Additional embodiments might involve real-time translation artificial intelligence models that can instantly convert the operator's speech into text in multiple target languages simultaneously, enhancing accessibility for a global audience.

The synchronize movement, audio, and text step 770 preferably coordinates the mouth movement data, extracted speech audio, and converted text to ensure seamless integration into the holographic representation. This synchronization is important for creating a believable and natural interaction, where the visual movements of the mouth align with the sound of the speech and any accompanying text display. Additional embodiments might involve dynamic adjustment of synchronization based on network latency or processing load, ensuring that the holographic presentation remains fluid and responsive under various operational conditions.

The integration step 780 preferably combines all the synchronized data (from synchronize movement, audio, and text step 770) and the extracted wireframe data (from extract wireframe step 750) into the final holographic representation. This stage preferably renders the complete holographic output, including the animated body, lip-synced speech, and any on-screen text, ready for projection by the hologram projection unit. The integration step 780 preferably delivers a lifelike and interactive telepresence.

Figure 8:
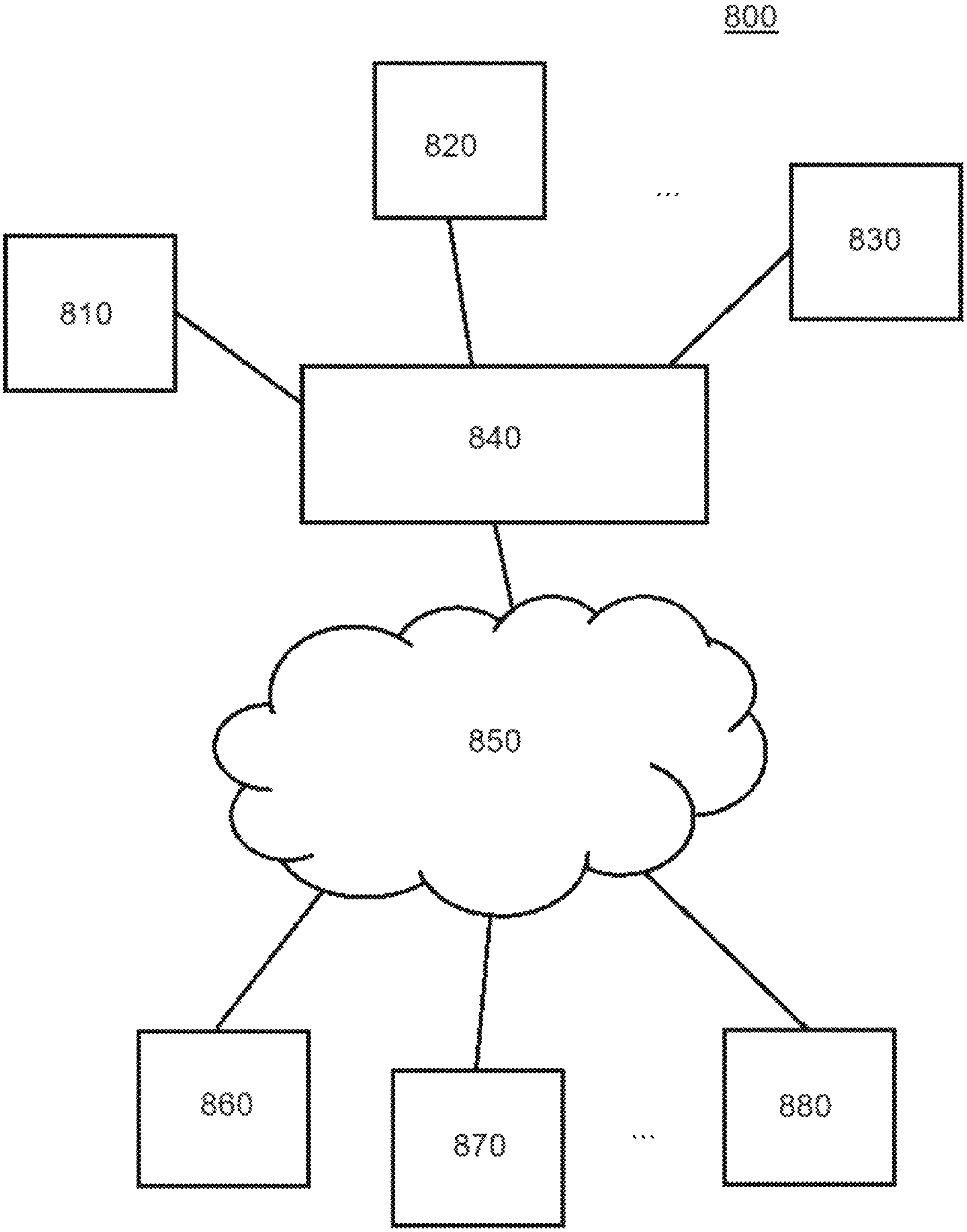
FIG. 8 provides a block diagram of an exemplary visitor management system architecture.

FIG. 8 illustrates an exemplary visitor management system (VMS) architecture 800, demonstrating how operator station 1 810, operator station 2 820, through operator station n 830 can interact with user station 1 860, user station 2 870, through user station n 880 through a central system core 840, all preferably connected via a network 850. This architecture highlights the scalability and centralized management capabilities of the interactive holographic telepresence system when applied to a visitor management context. The operator stations allow remote operators to oversee and manage visitor interactions, while the user stations serve as the holographic interfaces for visitors. The system core 840 preferably processes much of the relevant data and orchestrates the holographic experiences, and the network 850 allows for communication across the entire system. This setup facilitates efficient and personalized visitor experiences, dependent on a visitor's interaction with the visitor management system.

The operator station 1 810, operator station 2 820, through operator station n 830 represent multiple workstations, similar to the operator workstation described in FIG. 2, from which remote operators can manage the holographic telepresence system. Each operator station preferably typically includes monitors, control interfaces, and capture systems for the operator's image and voice. These multiple stations preferably allow for distributed control and monitoring, enabling a single operator to handle multiple user displays or multiple operators to collaborate in managing a complex or busy facility. Additional embodiments might incorporate advanced collaborative tools, enabling multiple operators to simultaneously interact with the same holographic projection, providing comprehensive support to visitors.

The system core 840 functions as the central processing facility or server for the entire visitor management system architecture 800. The system core 840 preferably integrates the generative artificial intelligence engine and handles data processing, decision-making, and communication routing between operator stations and user stations. It acts as the core of the system, orchestrating the holographic interactions, automated responses, and data logging for visitor management. Core 840 may employ a modular microservices architecture that allows for flexible scaling and updating of individual system components. Additional embodiments might integrate advanced analytics and reporting capabilities within the system core 840, providing administrators with real-time insights into visitor traffic, interaction patterns, and system performance.

The network 850 preferably provides the communication infrastructure for the visitor management system architecture 800, connecting all operator stations, the system core 840, and user stations. Similar to network 320 in FIG. 3, the network 850 seeks to ensure reliable and real-time data exchange, which is important for the responsiveness of holographic interactions. The network 850 can utilize various technologies, including wired Ethernet, Wi-Fi, 5G, or a combination thereof, adapted to the specific requirements of the facility. Network 850 might include public networks (such as the Internet), private networks, or a combination of both.

User station 1 860, user station 2 870, through user station n 880 represent a varying number of the holographic projection units and interactive interfaces for visitors or end-users, similar to the monitors (334, 344, 354) and their associated components at remote areas (360, 370, 380) shown in FIG. 3. These user stations present the holographic representations and allow visitors to interact with the system, for example, by swiping their driver's license, presenting an RFID card or mobile application, asking questions, etc. The user stations are preferably equipped with sensors to capture visitor input and displays to project the holographic responses. Alternative embodiments for user station 1 860, user station 2 870, through user station n 880 include customizable form factors, such as wall-mounted displays, freestanding kiosks, or integrated reception desks. Additional embodiments might incorporate advanced accessibility features, such as voice-activated controls for individuals with mobility impairments, or tactile feedback systems for visually impaired users.

Figure 9:
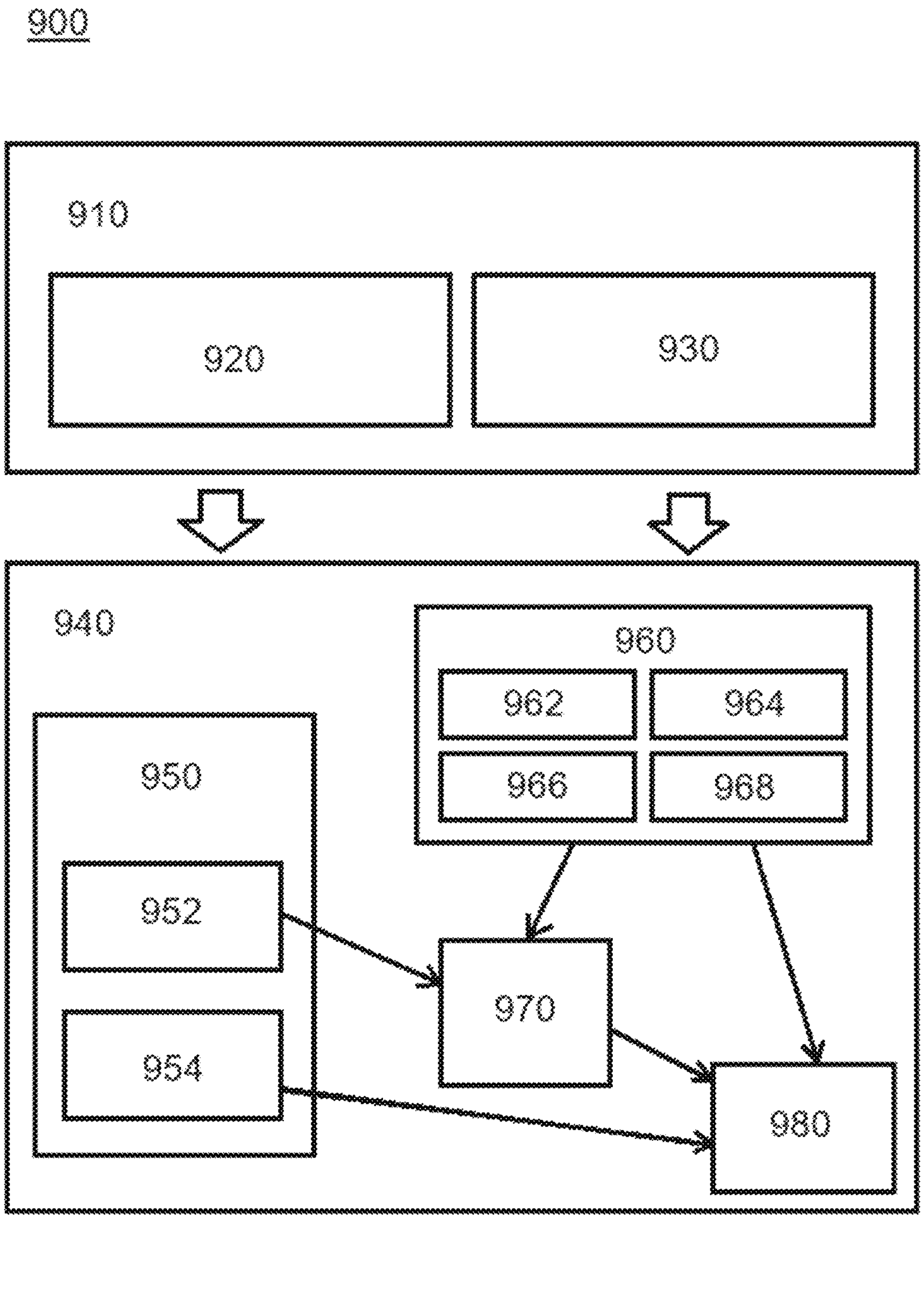
FIG. 9 depicts a block diagram of exemplary system core software modules.

FIG. 9 illustrates an exemplary embodiment of a preferred system core software module 900, presenting a block diagram of the functional components within the system core 840 (as shown in FIG. 8) for the interactive holographic telepresence system. The modules include a video capture module 910, which contains a face locator module 920 and a body locator module 930. The outputs of these modules 910, 920, 930 feed into an artificial intelligence (AI) module 940. The artificial intelligence module 940 may include a motion model 950 with a face tracking model 952 and a body tracking model 954. An audio model 960 preferably comprises a speech extraction model 962, a text-to-speech model 964, a language translation model 966, and a speech-to-text model 968. A synchronization model 970 and a holographic integration model 980 process and combine the data for output to a user station.

The system core software module 900 forms the algorithmic and computational backbone of the interactive holographic telepresence system. These modules preferably work in concert to capture operator input, process environmental cues, generate enhanced holographic representations, and facilitate real-time interactions. The modular design allows for flexibility in deployment and scalability of features, making the system adaptable to various applications from security to customer service. The interconnectedness of these modules enables complex artificial intelligence-driven enhancements and responses. Alternative embodiments for system core software module 900 may include a microservices architecture, where each module runs as an independent service, allowing for easier updates and scaling. Additional embodiments might integrate a distributed artificial intelligence framework, enabling different artificial intelligence models to be deployed on various hardware platforms for optimized performance and resource utilization.

The video capture module 910 handles the acquisition of video and audio input from sensors at the operator station. This module is responsible for receiving the raw video stream and preparing it for further processing by the artificial intelligence module 940. The video capture module 910 may include functionalities for video encoding, decoding, and initial frame buffering. The module also preferably contains sub-modules, including face locator module 920 and body locator module 930.

The face locator module 920 preferably identifies and precisely locates the operator's face within the incoming video data from video capture module 910. This module preferably uses computer vision techniques to detect facial landmarks and define the boundaries of the operator's face, allowing for subsequent face tracking and facial expression analysis. Accurate face localization provides for realistic holographic facial animations.

The body locator module 930 preferably identifies and locates the operator's entire body within the video data from video capture module 910. This module is preferably responsible for segmenting the operator's figure from the background and estimating body posture and skeletal joint positions. This body localization provides the foundation for full-body holographic animation and wireframe extraction. Additional embodiments might incorporate a multi-view body reconstruction algorithm, utilizing input from several cameras to create a highly accurate 3D model of the operator's body shape and movements.

The artificial intelligence (AI) module 940 is preferably the central processing core for the artificial intelligence-driven tasks within the system core software module 900. Module 940 receives processed video and audio data from the video capture module 910 and preferably includes several sub-modules, including motion model 950, audio model 960, synchronization model 970, and holographic integration model 980. The artificial intelligence module 940 preferably orchestrates the generative artificial intelligence engine's functionalities, from enhancing holographic representations to generating visual and audio effects and interactive responses. Artificial intelligence module 940 may include a distributed artificial intelligence architecture where different models run on specialized hardware (e.g., GPUs, TPUs) for optimal performance, or a hybrid artificial intelligence approach combining symbolic artificial intelligence with neural networks for robust reasoning and pattern recognition.

The motion model 950 processes motion data extracted from the video feed, focusing on both facial and body movements of the operator. This model preferably ensures that the holographic representation accurately mimics the operator's physical actions and expressions, contributing to a lifelike telepresence. The motion model 950 preferably includes face tracking model 952 and body tracking model 954. Additional embodiments might incorporate a style transfer artificial intelligence model within motion model 950, allowing the holographic representation to adopt specific movement styles or mannerisms, such as a more formal posture for a security role.

The face tracking model 952 preferably continuously monitors and tracks facial movements of the operator, particularly focusing on the mouth. This model processes data from the face locator module 920 and generates parameters for animating the holographic representation's facial expressions and lip synchronization. Additional embodiments might incorporate emotional recognition artificial intelligence within face tracking model 952, enabling the holographic representation to mirror the operator's emotional state, enhancing non-verbal communication.

The body tracking model 954 preferably tracks the operator's full body movements and posture, using data from the body locator module 930. This model generates skeletal and kinematic data that is used to animate the full-body holographic representation, aligning its physical actions with the operator's actions. Preferably, the body tracking model 954 can also extract wireframe data. Additional embodiments might integrate artificial intelligence models that can interpret and adapt body language to different cultural contexts, ensuring that the holographic representation's gestures are universally understood.

Audio model 960 preferably handles all audio-related processing, including speech input from the operator and environmental sounds from the remote locations. This comprehensive model includes various sub-modules for processing, converting, and translating audio data.

The speech extraction model 962 preferably extracts the operator's speech from the audio input, filtering out background noise and other irrelevant sounds. This refined speech signal is then preferably passed to other audio sub-modules for further processing, such as text conversion, translation, and/or voice modification. Various embodiments of speech extraction model 962 might include adaptive noise reduction algorithms that learn and suppress ambient sounds, or deep learning models trained to isolate individual voices in multi-speaker scenarios, such as a situation where multiple operators are operating in proximity to one another.

The text-to-speech model 964 preferably converts textual information, potentially generated by the operator or artificial intelligence, into spoken audio for the holographic representation. This allows the hologram to verbalize responses, directions, or information that are entered into the system as text. The model can be configured with various voices, tones, and languages to suit different interaction contexts. Embodiments for text-to-speech model 964 may include neural text-to-speech artificial intelligence models that generate highly natural and expressive voices, or models that can adapt the voice characteristics to match the holographic avatar's appearance. Additional embodiments might integrate real-time voice cloning artificial intelligence within text-to-speech model 964, allowing the holographic representation to speak with a synthesized voice that closely resembles the actual operator's voice.

The language translation model 966 preferably facilitates communication across language barriers by translating spoken or textual input into different languages. This model can translate the operator's speech for display as text to remote individuals, or translate a remote individual's speech for the operator. Translation expands the system's applicability to diverse linguistic environments. Additional embodiments might incorporate a cultural context artificial intelligence within language translation model 966, ensuring that translations are not only linguistically accurate but also culturally appropriate for the target audience.

The speech-to-text model 968 preferably converts spoken audio from the operator or remote individuals into textual format. This model allows for displaying closed captioning alongside the holographic representation, for processing verbal queries, or for archiving conversations. Additional embodiments might integrate a personalized speech-to-text artificial intelligence model that learns the unique vocal patterns and vocabulary of operator 212, improving transcription accuracy.

The synchronization model 970 preferably aligns the various streams of data, including mouth movement data from face tracking model 952 and audio-derived data from audio model 960, to coordinate the holographic representation's visual and auditory outputs. This synchronization allows for creating a believable and immersive interactive experience. Any delay or misalignment in synchronization can detract from the realism of the telepresence. Additional embodiments might incorporate a feedback loop within synchronization model 970 that dynamically adjusts timing offsets based on real-time network latency, enhancing consistent performance even under varying network conditions.

The holographic integration model 980 preferably combines all processed and synchronized data from the motion model 950, audio model 960, and synchronization model 970 into the final holographic representation. This model is responsible for rendering the complete animated hologram, including body movements, facial expressions, lip-synced speech, and any accompanying visual or audio effects. The output of the holographic integration model 980 is then sent to a user station for projection.

Figure 10:
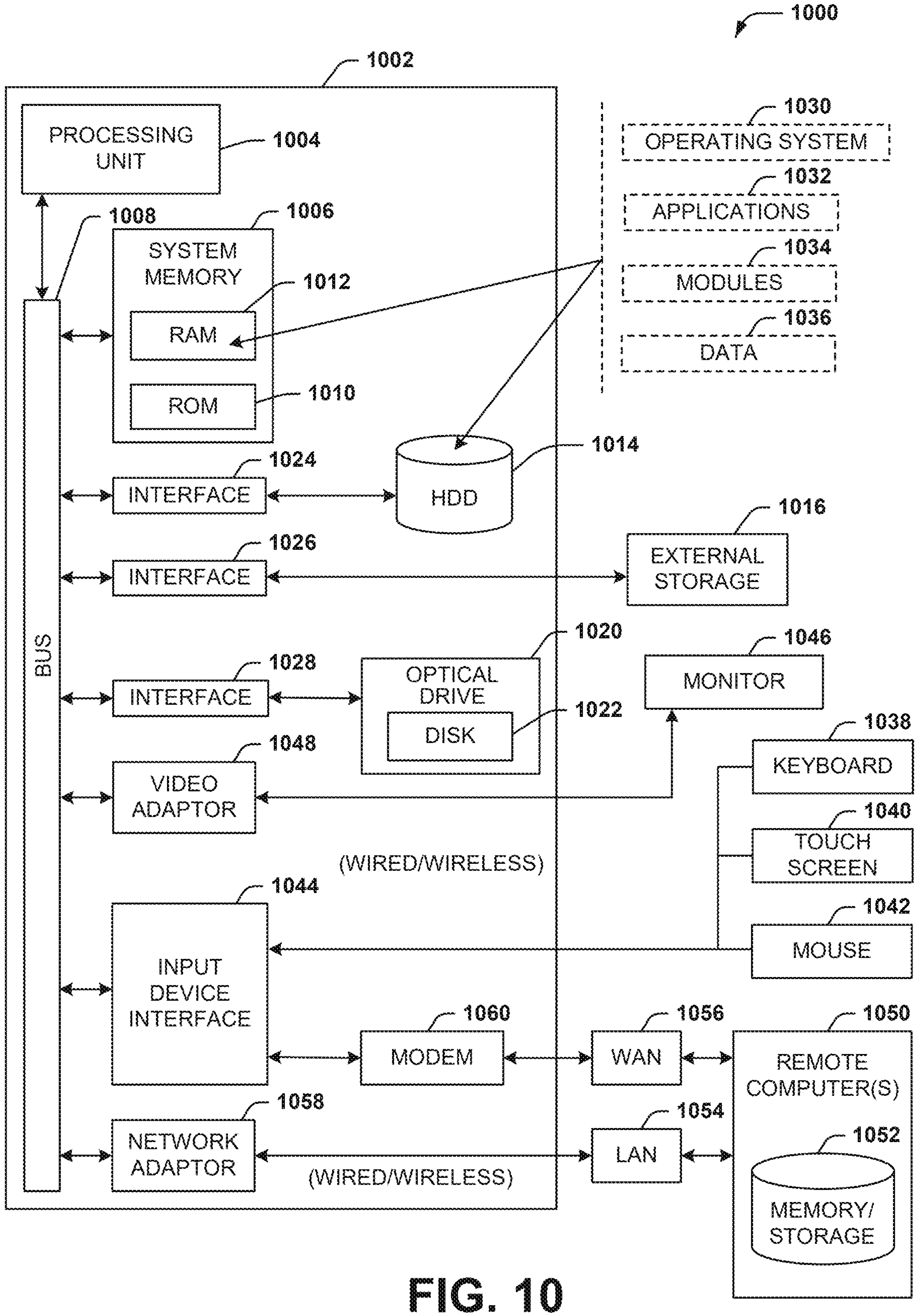
FIG. 10 illustrates a computing environment that may be deployed in support of an embodiment of the present invention.

To provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The embodiments of the present disclosure as disclosed herein are intended to be illustrative and not limiting. Other embodiments are possible and modifications may be made to the embodiments without departing from the spirit and scope of the disclosure. As such, these embodiments are only illustrative of the inventive concepts contained herein.

The invention claimed is:

1. A system for interactive holographic telepresence, the system comprising:

a plurality of hologram projection units, each unit configured to project a holographic avatar;

an operator station, comprising a display screen configured to show real-time feeds from cameras positioned at each physical location of the plurality of hologram projection units, a control interface for selecting a specific physical location, and a capture system configured to capture a video and audio of an operator;

a generative artificial intelligence (AI) engine, configured to process real-time data received from the operator station, the generative AI engine further configured to generate at least one enhanced holographic avatar based on the processed real-time data; and a communication network, for real-time data transmission of the at least one enhanced holographic avatar to at least one of the plurality of hologram projection units.

2. The system of claim 1, wherein the generative AI engine is further configured to analyze speech input from the operator and to transmit audio with the real-time data transmission of the at least one enhanced holographic avatar.

3. The system of claim 2, wherein the generative AI engine is further configured to analyze speech input from the operator and to alter the operator's voice in the transmitted audio.

4. The system of claim 1, wherein the generative AI engine is further configured to analyze environmental cues received from at least one of the plurality of hologram projection units, to generate an automated response to the cues, and to transmit the automated response to at least one of the hologram projection units.

5. The system of claim 4, wherein the automated response is selected from providing directions and triggering an alarm.

6. The system of claim 4, wherein the automated response is activating or deactivating equipment.

7. The system of claim 6, wherein the equipment is chosen from conveyor belts, doors, locks, additional monitoring devices, scanning devices, lights, and computing devices.

8. The system of claim 1, wherein the generative AI engine is further configured to dynamically change the appearance of the holographic avatar by adjusting one or more of skin tone, dress, clothing, accessories, voice, hair color, hair style, makeup, stature, posture, facial expressions, intonation, volume, and background.

9. The system of claim 1, wherein the holographic avatar may be presented using a transparent display screen with depth perception.

10. A method for interactive holographic telepresence, the method comprising:

capturing a video feed of an operator at an operator station;

transmitting the video feed to a generative artificial intelligence (AI) engine;

analyzing speech from the operator using the generative AI engine;

generating dynamic visual effects based on the analyzed speech and environmental cues;

enhancing a holographic avatar with the generated dynamic visual effects;

transmitting the enhanced holographic avatar to a selected hologram projection unit; and projecting the enhanced holographic avatar using the selected hologram projection unit to create a holographic representation for interaction with one or more individuals.

11. The method of claim 10, further comprising monitoring one or more physical locations via a display screen at the operator station; and selecting a specific physical location using a control interface to create the holographic representation at a corresponding hologram projection unit.

12. The method of claim 10, wherein analyzing speech from the operator comprises using a speech-to-text AI model to convert spoken words into text.

13. The method of claim 12, further comprising displaying a portion of the text at the selected hologram projection unit.

14. The method of claim 10, further comprising using a text-to-speech AI model to convert information typed by the operator into speech; and transmitting the speech to the selected hologram projection unit.

15. The method of claim 10, further comprising generating a holographic video of the operator's mouth movement based on audio input, such that the holographic representation appears to be talking even when a live video feed of the operator is not present.

16. The method of claim 15, wherein generating the holographic video of the operator's mouth movement may involve taking a video feed of a person, extracting the face, applying a language model to move the mouth on the extracted face, and then integrating the modified face back into the original video to provide a full-body video of the person talking.

17. The method of claim 10, further comprising triggering automated responses based on the environmental cues, which may include providing directions, triggering alarms, or activating equipment.

18. A computer program product comprising a non-transitory computer-readable medium storing instructions that, when executed by one or more processors, cause the one or more processors to perform operations for interactive holographic telepresence, the operations comprising:

receiving a video feed of an operator;

receiving audio input from the operator;

processing the video feed and audio input using a generative artificial intelligence (AI) engine;

generating enhanced holographic representation data based on the processed video feed and audio input;

transmitting the enhanced holographic representation data to a hologram projection unit;

causing the hologram projection unit to project a holographic representation incorporating the enhanced holographic representation data;

detecting sounds of distress or unauthorized access from a sensor of the hologram projection unit; and generating an alarm signal based upon the sounds.

19. The computer program product of claim 18, wherein the operations further comprise analyzing the operator's speech to identify keywords or phrases and generating corresponding visual aids for display with the holographic representation.

20. The computer program product of claim 18, wherein the operations further comprise generating dynamic art displays for entertainment or engagement; and transmitting the dynamic art displays to the hologram projection unit.

21. The computer program product of claim 18, wherein the operations further comprise adjusting the appearance of the holographic representation in real-time based on contextual enhancements.

22. The computer program product of claim 18, wherein the operations further comprise processing the operator's audio input to generate mouth movements;

generating second enhanced holographic representation data based on the mouth movements; and transmitting the second enhanced holographic representation data to the hologram projection unit.

* * * * *